(12) United States Patent
Nishikawa

(10) Patent No.: US 7,032,989 B2
(45) Date of Patent: Apr. 25, 2006

(54) IMAGE PROCESSING METHOD AND IMAGE PROCESSING APPARATUS

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 10/629,696

(22) Filed: Jul. 30, 2003

(65) Prior Publication Data

US 2004/0021885 A1 Feb. 5, 2004

(30) Foreign Application Priority Data

Jul. 31, 2002 (JP) ........................... 2002-224164
Jul. 31, 2002 (JP) ........................... 2002-224165

(51) Int. Cl.
*B41J 29/393* (2006.01)
*B41J 2/21* (2006.01)

(52) U.S. Cl. .......................... 347/19; 347/43
(58) Field of Classification Search ............... 347/43, 347/19, 15; 358/1.1, 1.9
See application file for complete search history.

(56) References Cited

U.S. PATENT DOCUMENTS 6,134,022 A * 10/2000 Yamamoto et al. .......... 358/1.9
6,292,195 B1 * 9/2001 Shimizu et al. ............. 345/604
6,575,095 B1 * 6/2003 Mahy et al. ................ 101/485

* cited by examiner

*Primary Examiner*—Thinh Nguyen
(74) *Attorney, Agent, or Firm*—Fitzpatrick, Cella, Harper & Scinto

(57) ABSTRACT

A conversion relationship associated with generation of data for a plurality of inks which have the same color but different concentrations is determined. For combinations of four colors, data on patches are generated which can be printed without causing ink to overflow. Then, with reference to a maximum color material use amount, a possible total color material use amount is calculated for each combination of six dark and light colors Y, M, C, K, Lm, and Lc. Then, for each combination, M and C are each separated into dark and light colors in accordance with the possible total color material use amount. Thus, a color separation table is generated which corresponds to combinations of six colors Y, M, C, K, Lm, and Lc.

36 Claims, 25 Drawing Sheets

IMAGE PROCESSING METHOD AND IMAGE PROCESSING APPARATUS

This application claims priority from Japanese Patent Application Nos. 2002-224164 filed Jul. 31, 2002 and 2002-224165 filed Jul. 31, 2002, which are incorporated hereinto by reference.

BACKGROUND OF THE INVENTION

1. Field of the Invention

The present invention relates to an image processing method and an image processing apparatus, and particularly to a process for determining a conversion relationship of a table or the like relating to data generation for color materials such as ink, which include a plurality of color materials of the same color but different in concentration and used in an image output apparatus such as an ink jet printer.

2. Description of the Related Art

In general, when an image output apparatus such as a printer is used to print and output a color image, four color materials for Y (Yellow), M (Magenta), C (Cyan), and K (black) are used. For example, an ink jet printer uses Y, M, C, and K inks. Further, a copy machine or a printer of an electrophotography uses Y, M, C, and K toners.

A color space realized by these color materials, used in the image output apparatus, is normally different from a color space for an original image data. Thus, in the field of image processing in which color material data is generated on based on image data, various image processing methods have been proposed to reproduce faithfully colors or gradations shown by the original image data or to reproduce desired colors and the like.

Among such image processing methods, the one shown in FIG. 25 is known. This image processing configuration has, as shown in FIG. 25, a luminance density converting section 1501, a UCR/BG processing section 1502, a BG amount setting section 1503, and a UCR amount setting section 1504. The luminance density converting section 1501 converts 8 bit data R'G'B', which is inputted luminance information, into CMY on the basis of the following equations:

$$C = -\alpha \log(R'/255) \quad (1)$$

$$M = -\alpha \log(G'/255) \quad (2)$$

$$Y = -\alpha \log(B'/255) \quad (3)$$

where, $\alpha$ is a predetermined real number.

Then, the UCR/BG processing section 1502 uses $\beta(\text{Min}(C, M, Y), \mu)$, set in the BG amount setting section 1503, and the value $\mu\%$, set in the UCR amount setting section 1504, to convert the CMY data as shown by the following equations:

$$C' = C - (\mu/100) \times \text{Min}(C, M, Y) \quad (4)$$

$$M' = M - (\mu/100) \times \text{Min}(C, M, Y) \quad (5)$$

$$Y' = Y - (\mu/100) \times \text{Min}(C, M, Y) \quad (6)$$

$$K' = \beta(\text{Min}(C, M, Y), \mu) \times (\mu/100) \times \text{Min}(C, M, Y) \quad (7)$$

where $\beta(\text{Min}(C, M, Y), \mu)$ is a real number varying depending on Min (C, M, Y) and $\mu$. This value enables the setting of a manner of adding K ink. The UCR amount and the BG amount are important parameters for a color separating process executed for a color printer, because these amounts have much effect on the color reproduction range of the color printer and the granularity of the printer associated with the manner of adding K ink (Indian ink).

Thus, depending upon the setting of $\beta$, for example, a color with the lowest density may be prevented from having a value of 0 without replacing any of Y, M, or C with K, and a combination of Y, M, C, and K which does not contain a value of 0 may be provided. Generation of such data enables outputting of images without any decrease in saturation or density.

The above described image processing relating to the color transformation is commonly carried out using a lookup table (LUT) having data used to carry out the color transformation as well as interpolation. The contents of the table are determined by printing patches for a plurality of combinations of the color materials Y, M, C, and K and subjecting the patches to a colorimetric operation. Specifically, if signal values for the respective color materials Y, M, C, and K constituting each patch data are expressed by 8 bits, then for example, patches are printed for 4,096 colors obtained by combining signal values of respective four color materials, each of which is one of 0, 32, 64, ..., 223, and 255 that are obtained by equally dividing 256 values for the respective colors into eight parts. Then, the patches are subjected to a colorimetric operation, and on the basis of the results of the colorimetric operation, a combination of Y, M, C, and K that reproduces a predetermined target is determined to be table data.

Further, ink jet printers and the like have been required to provide color printing with higher quality image. To achieve this, it has been common to use a plurality of inks of the same color such as magenta or cyan but different in concentration of stuff such as dyes in the color material. This system enables the sense of granularity associated with ink dots to be reduced in a low density portion of a printed image such as its high light portion.

However, even if image processing is executed so as to improve the reproducibility of the image output apparatus such as a printer as described above, actual printing in the printer or the like becomes improper owing to the relationship between the color materials and printing sheets. As a result, images cannot be reproduced as desired.

The process shown in FIG. 25 basically enables four color materials Y, M, C, and K to be simultaneously used. This tends to increase the total amount of used color materials. In particular, when a color with a high saturation is to be reproduced at a low lightness, the respective color materials realizing the color have high signal values, and then the amount of each color material used increases. Further, when a plurality of inks of the same color but different in concentration are used, the total amount of ink used increases.

In this case, some printers do not particularly restrict, for example, the use of ink or toner at a darkest point. For example, if the amount of cyan used at its maximum output is assumed to be 100%, then at the darkest point, the total amount of the four color materials used, that is, a total color material use amount is 400%. Thus, in actual printing, an ink jet printer cannot sufficiently absorb ink depending on the ink absorption characteristics of print sheets, and then, ink may overflow or bleed to hinder the density or the like from being accurately realized. Further, an electro-photographic printer using toner cannot sufficiently fix the toner to print sheets depending on the toner adhesion characteristics of the sheets. Again, the density cannot be accurately realized.

This problem may occur in the case of generating data for patches and printing them. If the patches are thus not accurately printed, colorimetric values, as a matter of course, do not reflect the printing characteristics of a printer that has printed the patches. This makes it impossible to generate the table for accurate color transformation.

SUMMARY OF THE INVENTION

The object of the present invention is to provide an image processing method and an image processing apparatus which enable the accurate determination of a conversion relationship associated with generation of data for a plurality of color materials such as ink which have the same color but different concentrations of color material stuff, and enable a printing operation to be performed while using a color space composed of plural types of color materials at a largest extent.

The another object of the present invention is to provide an image processing method and an image processing apparatus which enables printing to be performed while using a color space composed of plural types of color materials at a largest extent, while the consumption of color materials such as ink or toner is restricted.

In the first aspect of the present invention, there is provided an image processing method for determining a conversion relationship by using patches, the conversion relationship relating to a generation of color material data for an image output apparatus that outputs an image by using a plurality of kinds of color material including a plurality of color materials of a same color but differing in concentration, the method comprising the steps of:

providing a maximum total color material use amount which is determined by taking into account an adhesion characteristic of each of the plurality of kinds of color material to a printing medium used when the image output apparatus outputs the patches;

determining, for each of the patches, a combination of data for the plurality of kinds of color material constituting a patch within a range of the maximum total color material use amount; and determining a predetermined conversion relationship relating to the generation of color material data of the plurality of kinds of color material including a plurality of color materials of a same color but differing in concentration, on the basis of colorimetric values of the patches which are outputted based on the determined combinations of data for the plurality of kinds of color material for the patches.

In the second aspect of the present invention, there is provided an image processing apparatus for determining a conversion relationship by using patches, the conversion relationship relating to a generation of color material data for an image output apparatus that outputs an image by using a plurality of kinds of color material including a plurality of color materials of a same color but differing in concentration, the apparatus comprising:

holding means for holding a maximum total color material use amount which is determined by taking into account an adhesion characteristic of each of the plurality of kinds of color material to a printing medium used when the image output apparatus outputs the patches;

combination determining means for, for each of the patches, determining a combination of data for the plurality of kinds of color material constituting a patch within a range of the maximum total color material use amount; and color separation means for determining a predetermined conversion relationship relating to the generation of color material data of the plurality of kinds of color material including a plurality of color materials of the same color but differing in concentration, on the basis of colorimetric values of the patches which are outputted based on the determined combinations of data for the plurality of kinds of color material for the patches.

According to the above configuration, a maximum total amount of color materials used is determined taking into account the characteristics of adhesion of the plurality of types of color materials used in an image output apparatus to output images, to print media used to output the patches. Then, the patches are outputted by determining a combination of data on the plural types of color materials which data is required to output the patches, without exceeding the maximum total amount of color materials used. Then, on the basis of colorimetric values for the respective patches, a predetermined conversion relationship such as a color separation table is determined which is associated with generation of data for the plurality of types of color materials including a plurality of color materials having the same color but differing in concentration. Accordingly, this conversion relationship is based on the colorimetric values for the patches which are appropriately outputted in terms of the characteristics of adhesion of ink or toner to print media. Further, a printing operation can be performed while making the best of a color space composed of the plurality of types of color materials.

The maximum total amount of color materials used is determined taking into account the characteristics of adhesion of the plural types of color materials used by an image output apparatus to output images to print media used to output the patches. Then, a defined total color material use amount is determined as an amount within a maximum total color material use amount, for restricting the consumption of the color materials. Then, the patches are outputted by determining a combination of data on plurality of types of color materials used to output the patches without exceeding the defined total color material use amount. Then, on the basis of colorimetric values for the respective patches, a predetermined conversion relationship such as a color separation table is determined which is associated with generation of data for the plurality of types of color materials including a plurality of color materials having the same color but differing in concentration. Therefore, a printing operation can be performed in which the consumption of color materials such as ink or toner is restricted, while making the best of a color space composed of plural types of color materials within the range of the restricted consumption.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described below in detail with reference to the drawings.

(First Embodiment)

Figure 1:
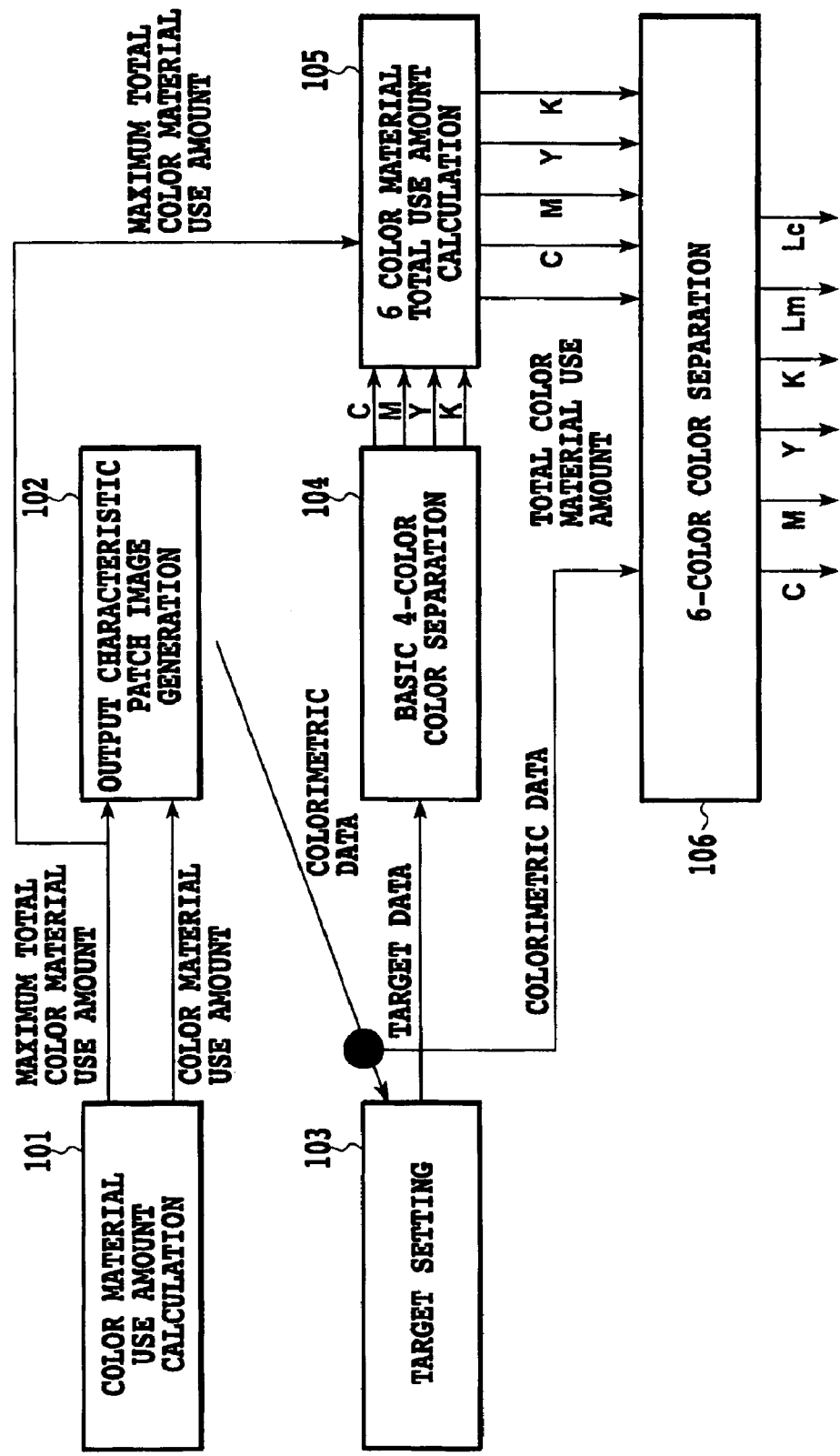
FIG. 1 is a block diagram showing an image processing configuration in a color printer according to a first embodiment of the present invention.

FIG. 1 is a block diagram showing a configuration of image processing for a color printer according to an embodiment of the present invention. This figure shows a process (herein after also called "color separation process") of forming patches and generating table data based on the results of a colorimetric step executed on the patches. This configuration specifically shows a process executed by, for example, a printer driver in a host computer as described below. However, this process may be executed by an image output apparatus such as a printer or shared by a host apparatus and the image output apparatus. It is apparent from the description below that the present invention is applicable to both of these forms.

As shown in FIG. 1, in the color separation process, a color material use amount calculation 101 is executed to calculate an amount (a color material use amount) of color material that is used, for each of the six inks Y, M, C, K, and Lm (light magenta) having lower concentration of dye than that the ink M has, Lc (light cyan) having lower concentration of dye than that the ink C has, which inks are used in the printer of the present embodiment, as well as a maximum total color material use amount.

The color material use amount is determined for each of the inks Y, M, C, K, Lm, Lc. In the present embodiment, the color material use amount is calculated in terms of 0% to 100% for signal values 0 to 255 each expressed by 8 bits, on the basis of a proportional relationship. Here, the use amount "A"% basically means that when a printing sheet is printed using ink ejection data for the printer which is obtained by subjecting an 8-bit signal to quantization such as binarization, an ink dot is formed on a corresponding pixel at the average probability of "A"%. However, taking a permeability of the inks Y, M, C, K, Lm and Lc into consideration, for some inks, this amount may be calculated in terms of 0% to 80% for the signal values 0 to 255, on the basis of a proportional relationship.

Then, when the color material use amount of e.g. ink C calculated, as described above, is assumed to be 100% (i.e. the use amount is 100% at the maximum signal value of 255), the maximum total color material use amount is determined as follows. Information on the type of a printing medium used in the printer, i.e. information on whether the printing medium used are ordinary paper, coated paper, or OHP paper, is obtained, and then on the basis of this information, the maximum percentage at which the ink C can be absorbed by the printing medium is calculated as the maximum total color material use amount.

An output characteristic patch image generation process 102 uses the maximum total color material use amount and the color material use amount for the four inks Y, M, C, and K, calculated by color material use amount calculation 101 so as to generate data for patches that can be printed while avoiding ink overflow (a condition that the ink can be absorbed by the printing medium). The patches printed based on this data are subjected to a colorimetric operation to obtain data on a color space expressed by L*a*b*, which can be reproduced by the printer. Of course, this colorimetric system is not limited to this aspect. It may be another colorimetric system for RGB, L*C*H*, or the like.

A target setting process 103, on the basis of the colorimetric data on the patches, generates a target having the highest saturation for each of the six hues Y (Yellow), M (Magenta), C (Cyan), R (Red), G (Green), and B (Blue) as described later in detail in FIG. 9. Then, A basic-4-clor color separation process 104, under the condition that the saturation is highest for each hue (the above targets), determines combinations of Y, M, C, and K.

Furthermore, a 6-color material total use amount calculating process 105 calculates a total color material use amounts of dark and light inks M, C, Lm, an Lc with reference to the maximum total color material use amount, based on the combination of the four colors Y, M, C, and K determined by the basic 4-color color separating process 104. A 6-color color separating process 106 generates a color separation table corresponding to a combination of six colors Y, M, C, K, Lm, and Lc, on the basis of the combination of four colors Y, M, C and K, the total color material use amount and the colorimetric data.

Figure 2:
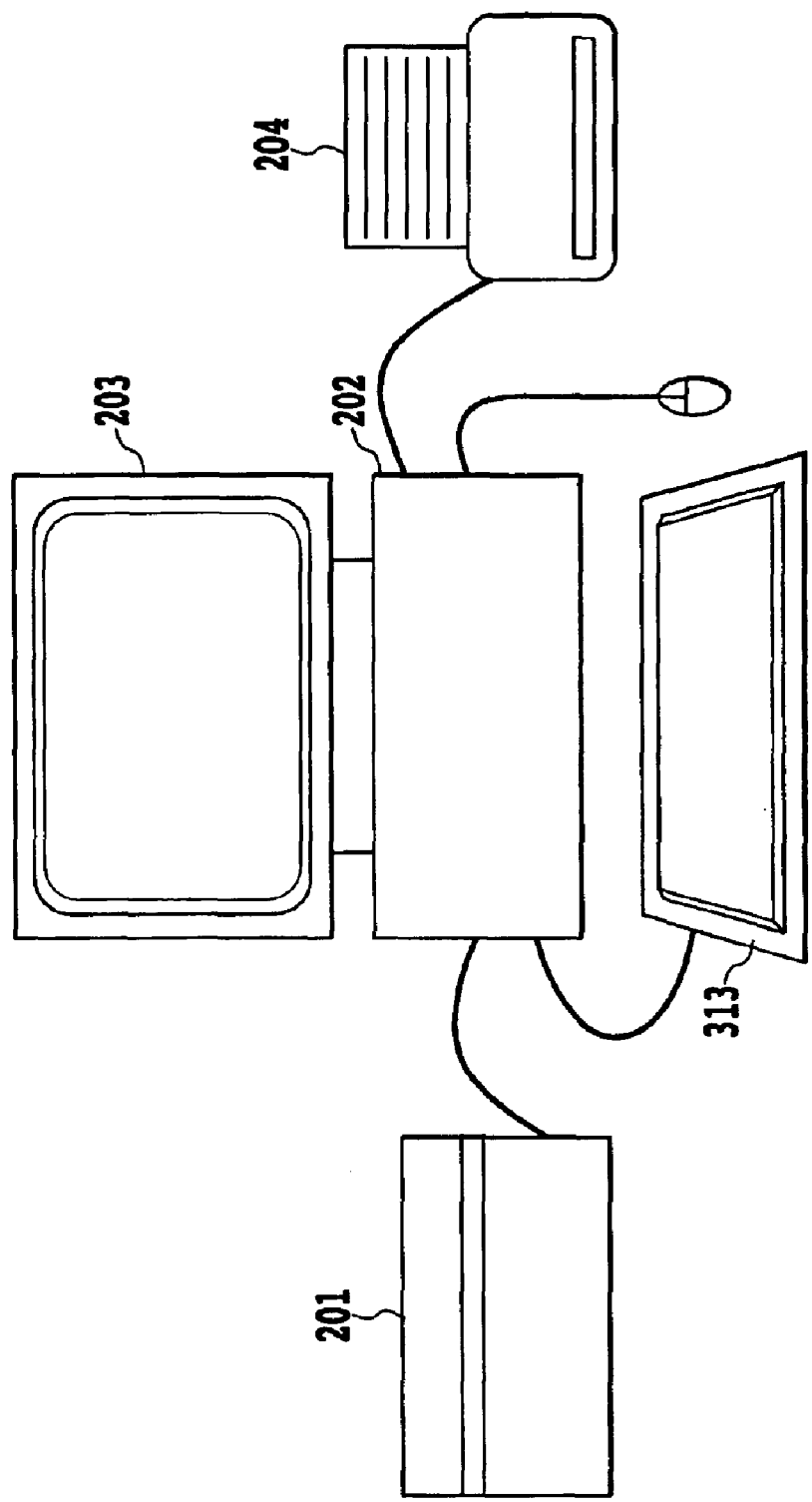
FIG. 2 is a diagram showing a specific image processing system that executes the image processing shown in FIG. 1.

FIG. 2 is a diagram showing a specific image processing system that executes the above image processing.

In this figure, reference numeral 201 denotes a spectrophotometer as an image signal input apparatus. Reference numeral 202 denotes a personal computer as a computer system. An image signal read by the spectrophotometer 201 is inputted to the personal computer 202. The personal computer 202 can then edit and store the image signal. It can also use a display 203 to display image signal information obtained by the edition or the like or can use a printer 204 as an image output apparatus to print the information. Further, reference numeral 313 denotes a keyboard and a mouse used by a user to input instructions on processing and control executed by the personal computer 202.

Figure 3:
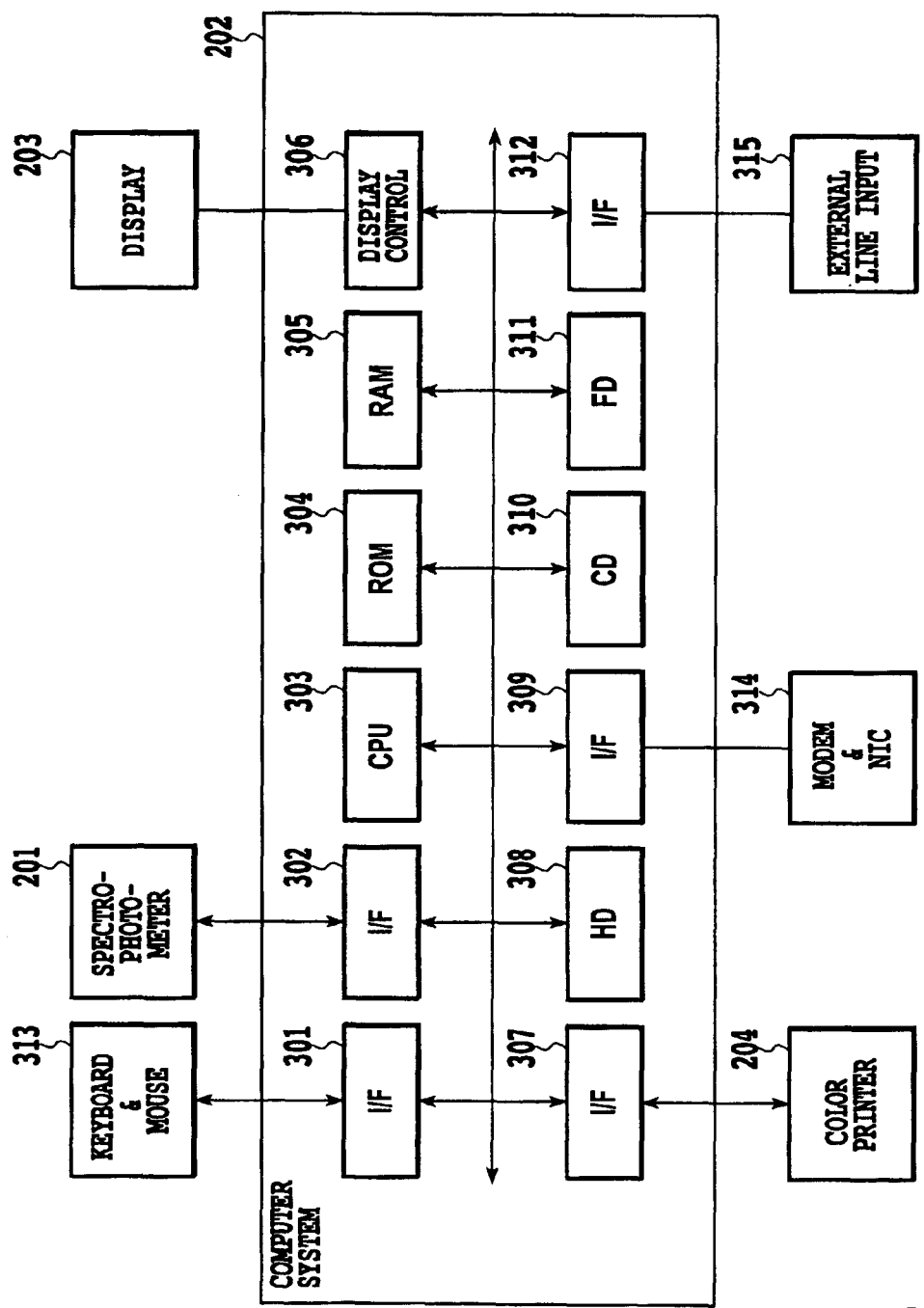
FIG. 3 is a block diagram showing main components of the system shown in FIG. 2, notably a personal computer.

FIG. 3 is a block diagram showing main components of the system shown in FIG. 2, especially of the personal computer 202.

In this figure, reference 301 denotes an interface (I/F) used to transmit and receive signals to and from the mouse and keyboard 313. Reference numeral 302 denotes also an interface (I/F) used to transmit and receive signals to and from the image input apparatus such as the spectrophotometer 201.

Reference numeral 303 denotes a CPU which controls, in accordance with programs, processing and operations performed by each element of the personal computer 202 and which execute predetermined processing. Reference numeral 304 denotes a ROM that stores the image processing shown in FIG. 1 and described later in FIG. 4, and the like. Reference numeral 305 denotes a RAM that temporarily stores programs and image data when the CPU executes the above processing or the like.

Reference numeral 306 denotes a display control device that controls the display device 203 displaying messages to an operator. Reference numeral 307 denotes an interface (I/F) used to connect the computer system 202 and the color printer 204 through signals. Reference numeral 308 denotes a hard disk (HD) which stores programs and image data to be transferred to the RAM 305 or the like for use and which saves processed image data. Reference numeral 309 denotes an interface (I/F) which connects, through signals, the computer system and transmission equipment 314 such as a modem or a network card which can transmit to external equipment various data to be retained in the respective areas in the computer system and receive various data from the external equipment. Reference numeral 310 denotes a CD drive that can read stored data from or write data in a CD (CD-R/CD-RW/DVD), an external storage medium. Reference numeral 311 denotes an FD drive that can similarly read data from and write data in an FD. If image editing programs or printer information or the like is stored in a CD, FD, DVD, or the like, these programs are installed in the HD 309 and transferred to the TAM 305 as required. Reference numeral 312 denotes a sound interface (I/F) to which an external line input 315 or a microphone is connected to receive external sound data.

Figure 4:
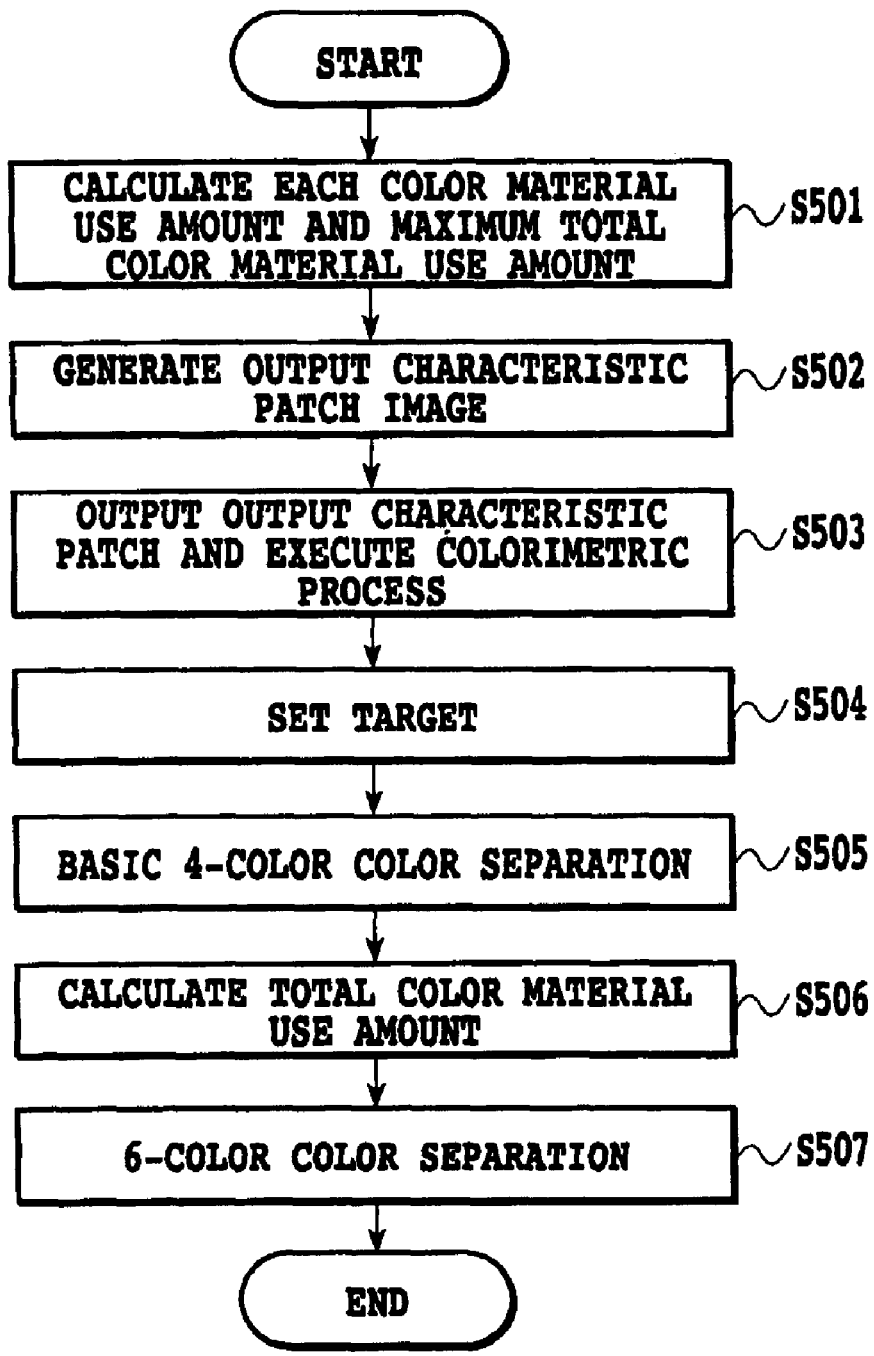
FIG. 4 is a flow chart showing a procedure of the image processing shown in FIG. 1, specifically a color separation table generating process executed by the configuration shown in FIGS. 2 and 3.

FIG. 4 is a flow chart showing a procedure of the image processing shown in FIG. 1, especially of a color separation table generating process executed by the configuration shown in FIGS. 2 and 3. A computer executable program in which the procedure shown in the flow chart in FIG. 4 is described is previously stored in the ROM 304. Alternatively, a program stored in the external storage device 308 may be loaded onto the RAM 305 so that the CPU 303 can execute the program.

First, at step S501, the maximum total color material use amount is calculated and the color material use amount are calculated for each of the signals for Y, M, C, K, Lm, Lc. As described in detail in FIG. 1, the color material use amount (%) is calculated for each of the 256 signal values of 0 to 255 for each of the inks Y, M, C, K, Lm, Lc. Further, the maximum total color material use amount is determined by obtaining information on the type of printing medium to be used in the printer of the present embodiment and calculating the maximum amount of ink (%) that can be absorbed by the printing medium. Specifically, the maximum total color material use amount can be determined by making reference to a previously determined relation between the type of printing medium and the maximum amount of ink that can be absorbed by that type of printing medium. The color material use amount for each ink calculated as described above and the maximum total color material use amount calculated in accordance with the type of printing medium are temporarily stored in RAM 305. It should be noted that the information on the type of printing medium may be set by an operator through a user interface when the operator instructs an execution of a program of this process, or may be detected by a media sensor (not shown) that reads the information on the type of printing medium. In order to deal with new type of printing medium, a value of the information read by the media sensor may be transmitted to a server thorough a network (not shown), and then the server recognizes what type the printing medium to be used is and gives back the value to the system shown in FIG. 2. Further, information on a correspondence between the type of printing medium and the maximum total color material use amount, which is held and used in the system shown in FIG. 2, may provided to a user, as information of version upgraded for the above application program dealing with the new type of printing medium, when the new type of printing medium is marketed. Then the user may rewrite a database of the application by using the information provided. If the above-described configuration for dealing with the new type of printing medium is employed, the user can input the information on the type of printing medium through the user interface to obtain the information on the maximum total color material use amount for the new type of printing medium.

Then, in step S502, the output characteristic patch image generation process 102 (FIG. 1) is executed to generate patches while avoiding ink overflow.

Figure 5:
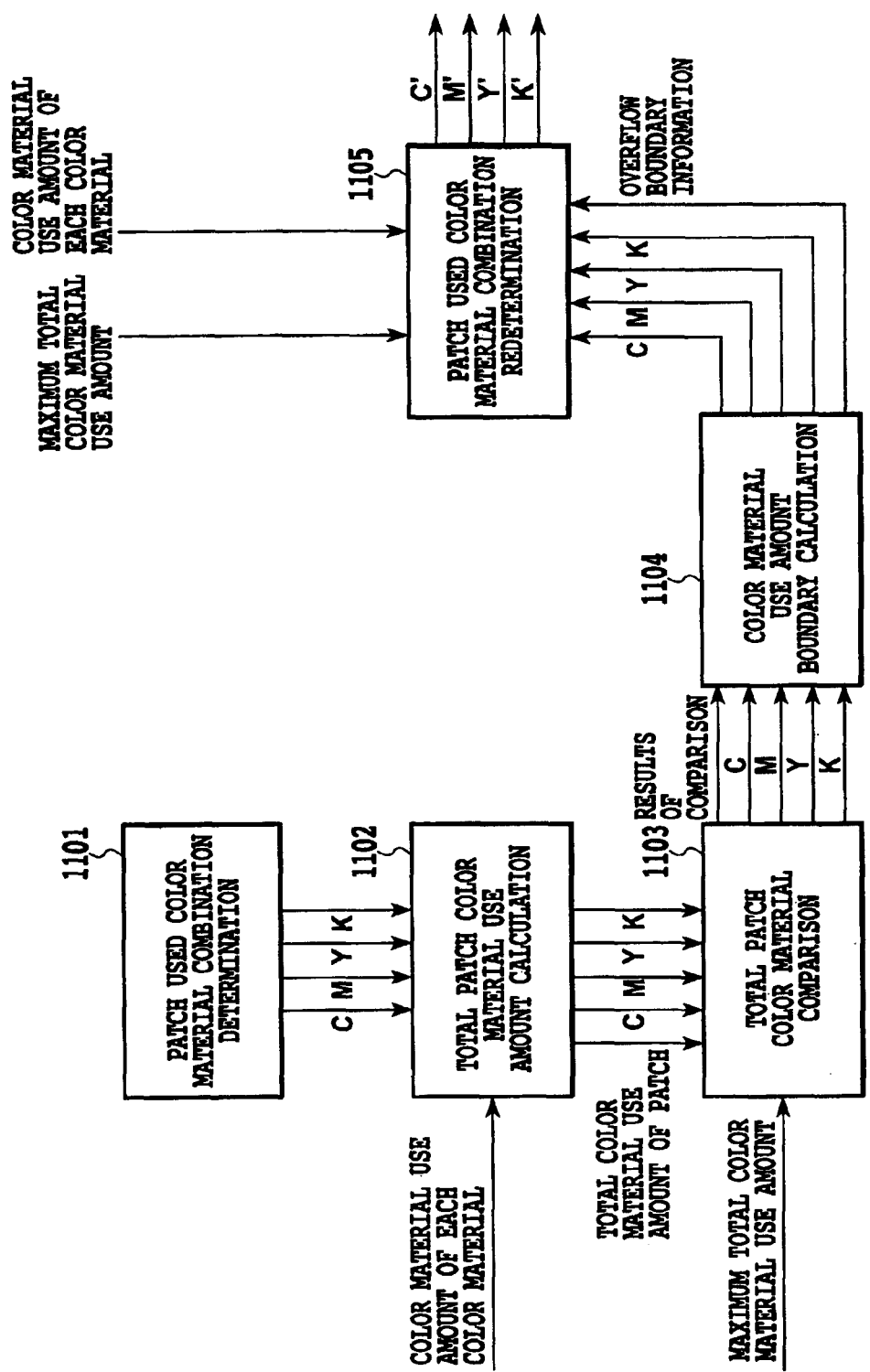
FIG. 5 is a block diagram showing the details of the output characteristic patch image generating process shown in FIG. 1.
Figure 6:
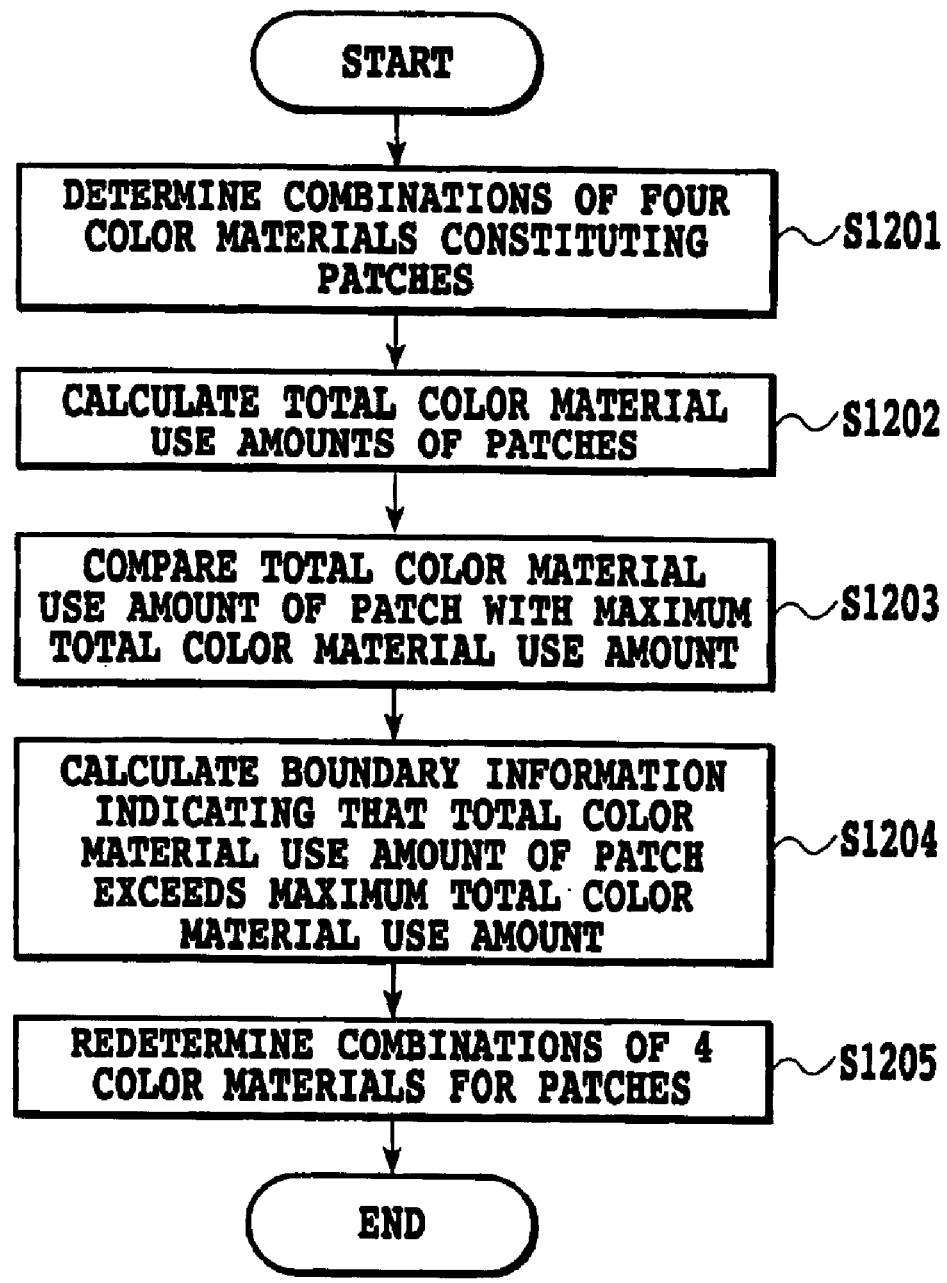
FIG. 6 is a flow chart showing the details of procedure of the output characteristic patch image generating process.

FIG. 5 is a block diagram showing the details of processing executed in the output characteristic patch image generation 102. FIG. 6 is a flow chart showing the details of the procedure, i.e. the processing executed in step S502. A patch generation process will be described with reference to these drawings.

First, in step S1201, a patch used color material combination determining process 1101 determines combinations of the six color materials Y, M, C, K, Lm, and Lc constituting patches. In the present embodiment, signal values 0 to 225 are equally divided by eight for each of four of the six color materials, i.e. Y, M, C, and K, and the fourth power of eight, i.e. 4,096 combinations are then determined. These patches are used to determine a color separation table for basic four colors as described later in FIG. 10. Further, for a set of M and Lm and a set of C and Lc, patches are outputted which are used to determine a ratio of light ink and dark ink in a process of using the light ink instead of the dark ink or both light and dark inks as described later in FIGS. 14 and 15. Thus, for each of the set of M and Lm and the set of C and Lc, the second power of eight, i.e. 64 combinations are determined: the eight means that the signal values are equally divided by eight. The RAM 305 temporarily stores these determined combinations of the four color materials or of two color materials for each of cyan and magenta having different concentrations. It should be noted that setting of patch data is not limited to the above-described combination manner and any combination manner may be used. For example, signals for each color material constituting the patches can be randomly determined.

Next, in step S1202, a total patch color material use amount calculating process 1102 is executed to calculate the total color material use amount of each combination of the basic 4 colors among the combinations of color materials determined in step S1201, with reference to the color material use amount for each signal value for each ink calculated in step S501. The total color material use amounts calculated are also stored in the RAM 305.

Furthermore, in step 1203, a total patch color material use amount comparing process 1103 is executed to compare the total color material use amount of each combination (patch) calculated in step S1202 with the maximum total color material use amount calculated in step S501 to determine whether or not the total color material use amount of that combination exceeds the maximum total color material use amount. Information on whether or not the total color material use amount of that combination exceeds the maximum total color material use amount is stored in the RAM 305 with the information made correspond to that combination.

Then, in step S1204, a total color material use amount boundary calculating process 1104 collects combinations determined to exceed the maximum total color material use amount and for each combination, calculates the amount of each of C and M exceeding the maximum total color material use amount. Furthermore, a compression rate for patch data used in the next step S1205 is calculated as boundary information and stored in the RAM 305. That is, this compression rate is determined so that the signal values for the patch (point B in FIG. 7, described later) having the largest amount exceeding the maximum total color material use amount is compressed and do not exceed the maximum total color material amount (in the present embodiment, the signal values are equal to the maximum total color material amount). This compression rate corresponds to the ratio of a distance OB' to a distance OB. Then, in the next step S1205, the data on all the patches is uniformly compressed using this compression rate.

Figure 7:
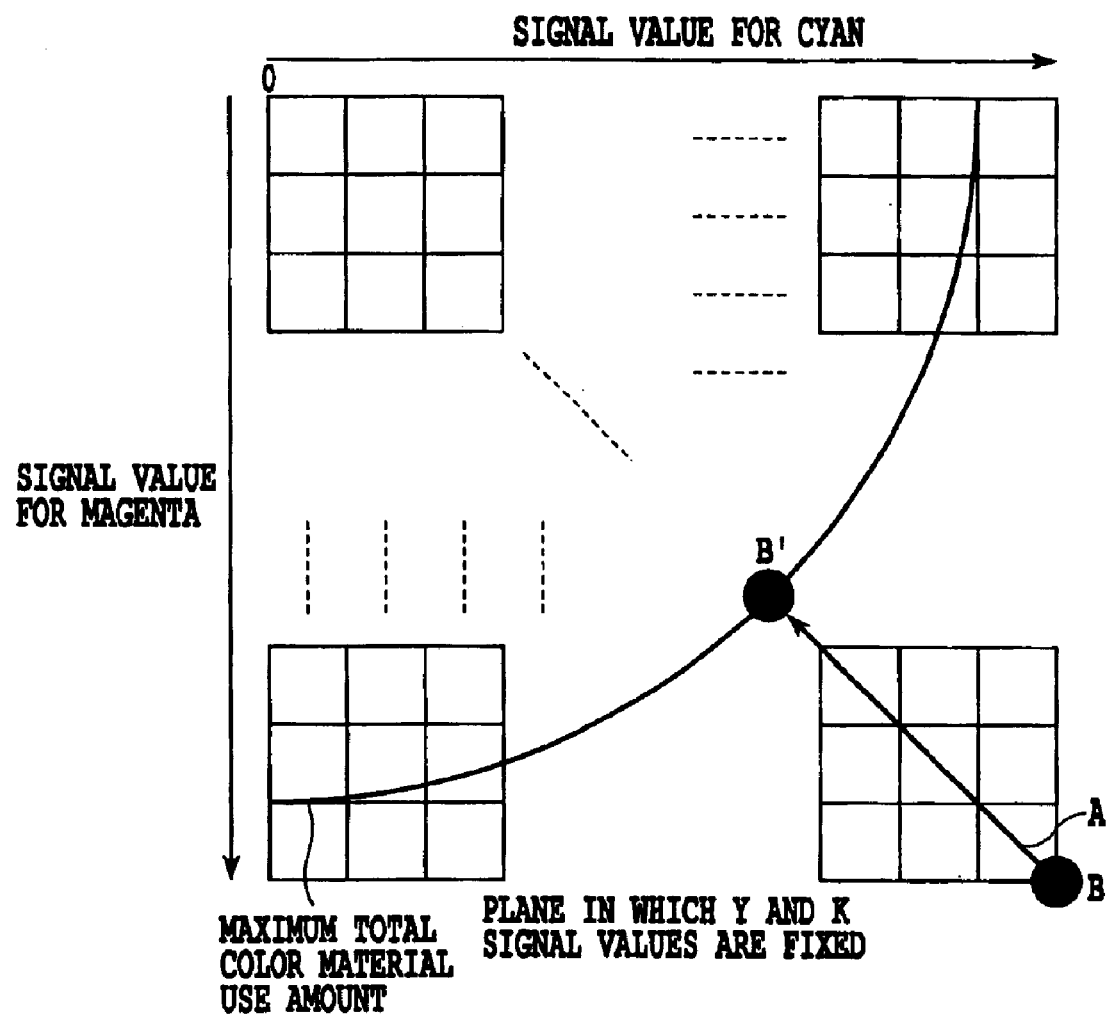
FIG. 7 is a diagram of patches showing a boundary for the maximum total color material use amount which is determined by the patch image generating process.

FIG. 7 is a diagram of patches showing a boundary for the maximum total color material use amount determined as described above. This figure shows the patches generated by combining the basic 4 colors together and changing the signal values for the inks C and M while fixing the signal values for the inks Y and K. Further, in this figure, the smallest squares each represents one patch, with the illustration of patches in an intermediate portion omitted.

The boundary between an area in which the total color material use amount exceeds the calculated maximum total color material use amount and an area in which the total color material use amount does not exceed the maximum total color material use amount is represented as a line for the maximum total color material use amount drawn as a quarter circumference in the figure. This line is represented as a circumference for the convenience of description and illustration. However, actually, the boundary line corresponds to the case in which a value for the ink (color material) use amount into which the sum of the signal values for the inks(Y, K) C and M has been converted equals the given maximum total color material use amount. For example, if the signal values for the inks C and M are converted into ink use amounts at the same rate, then this line is straight.

When the inks Y and K have relatively large signal values, then the total color material use amount is large as a whole. Accordingly, the line of the maximum total color material use amount appears on patch data as shown in the figure. Specifically, when the C and/or M, constituting the patches, has a lager signal value than the line of the maximum total color material use amount for C and/or M, the patch printed based on the combination of these signals is not accurately printed because of possible ink overflow. Thus, in the present embodiment, in the next step S1205, the signal values for all the patches are uniformly compressed so that the total color material use amounts for all patches have values inside the above line.

Figure 8:
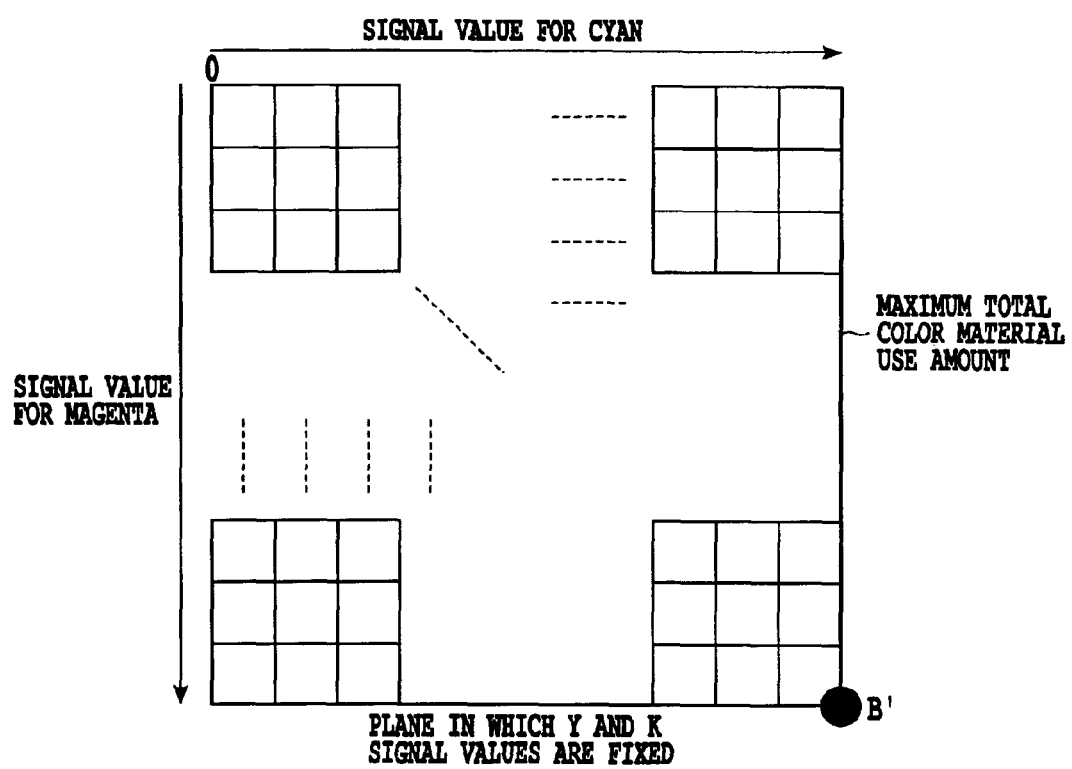
FIG. 8 is a diagram of patches showing the results of a patch data compressing process based on information on the boundary for the maximum total color material use amount in the color separation table generating process.

More specifically, in step S1205, a patch used color material combination redetermining process 1105 compresses M and C values for all the patches in accordance with the compression rate calculated in step S1204. As described above in FIG. 1, if any of the color materials for M and C has a different conversion rate, which is used in calculating the color material use amount (that is, a different rate of contribution to the total color material use amount), then for this color material, the compression rate depends on this conversion rate. For example, if the largest conversion rate is 80%, the compression rate is 80% of the one calculated as described above. With the above process, a point B, shown in FIG. 7 and most markedly exceeding the maximum total color material use amount, is compressed in the direction of arrow A toward the origin, to a point B'. The values for the other patches are compressed at the same compression rate. Thus, as shown in the patch image in FIG. 8, the total color material use amounts for all the patches in the patch image are adjusted so as not to exceed the maximum total color material use amount.

In the above description, the values for the color materials Y and K are fixed, and the patches with these values have been described. However, of course, patches in which the color materials Y and K have other values are similarly processed and all the patches exceeding the maximum total color material use amount are compressed for all the combinations of the basic color materials Y, M, C, and K, among the color materials for which the use amounts are calculated in step S501. Further, in the above example, the signal values for the color materials M and C are compressed. However, the signal values for other color materials may be compressed. Alternatively, the maximum total color material use amount may be calculated one-, three-, or four-dimensionally so that the signal values for one, three, or four color materials can be compressed.

In the above compression process, the combinations of the basic 4 colors are redetermined to finish step S502. As a result of this step, none of the printed patches exceed the maximum total color material use amount, and therefore proper patches can be printed without causing ink overflow or the like.

Referring back to FIG. 4, in the next step S503, the printer 204 of the present embodiment prints the patches on the basis of the patch data generated in step S502. Then, the printed patches are subjected to a colorimetric operation. The colorimetric operation for the patches can be performed using the spectrophotometer 201 or the like. The results of the colorimetric operation on the patches in terms of L*a*b* values are temporarily stored in the RAM 305. Further, if the results of the colorimetric operation require a large capacity, the external storage device 308 or the like is also utilized.

In step S504, within the range of the colorimetric operation, a target as a target color having the highest saturation is set for each of the six hues Y (Yellow), M (Magenta), C (Cyan), R (Red), G (Green), and B (Blue). In this regard, a color system for the target colors is not limited to L*a*b* but may be another colorimetric system such as L*C*H*.

The target for each hue is, for example in the case of the hue of cyan, what specifies the movement of colors white→cyan→black in a L*C* plane. This serves to set the characteristics of color transformation relating to a color reproduction. In the present embodiment, this target is represented as a color in an L*a*b* space, with its value represented as the distance from an L* axis (lightness axis) in an L*C* plane. Specific target data is represented as the above distance data for a predetermined number of points along the L* axis.

Figure 9:
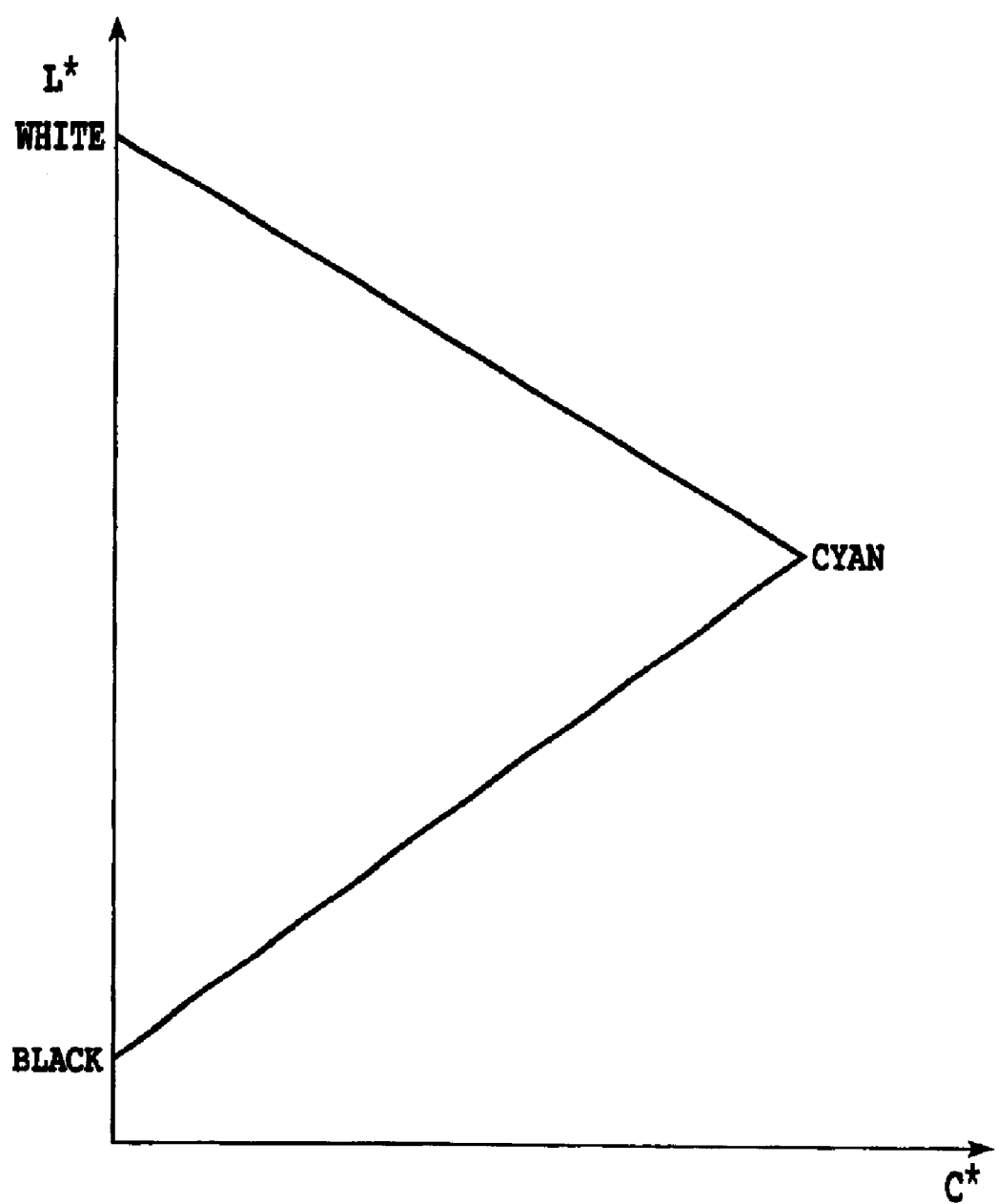
FIG. 9 is a diagram illustrating the general characteristics of a target in an L*C* plane from white to black through cyan which is used for the color separation table generating process.

In general, as shown in FIG. 9, the saturation (C*) of the target white→cyan→black in the L*C* plane increases until the target reaches cyan of a primary color while and decreases from the primary color of this target, having the highest saturation, to black, as the lightness (L*) decreases from white to black. For the setting for the target, it is known that a higher saturation is generally obtained by providing more of the color material K particularly while the saturation of the target is decreasing from its primary color to black, e.g. in an area from cyan to black, and then adding the color materials Y, M, and C.

Figure 10:
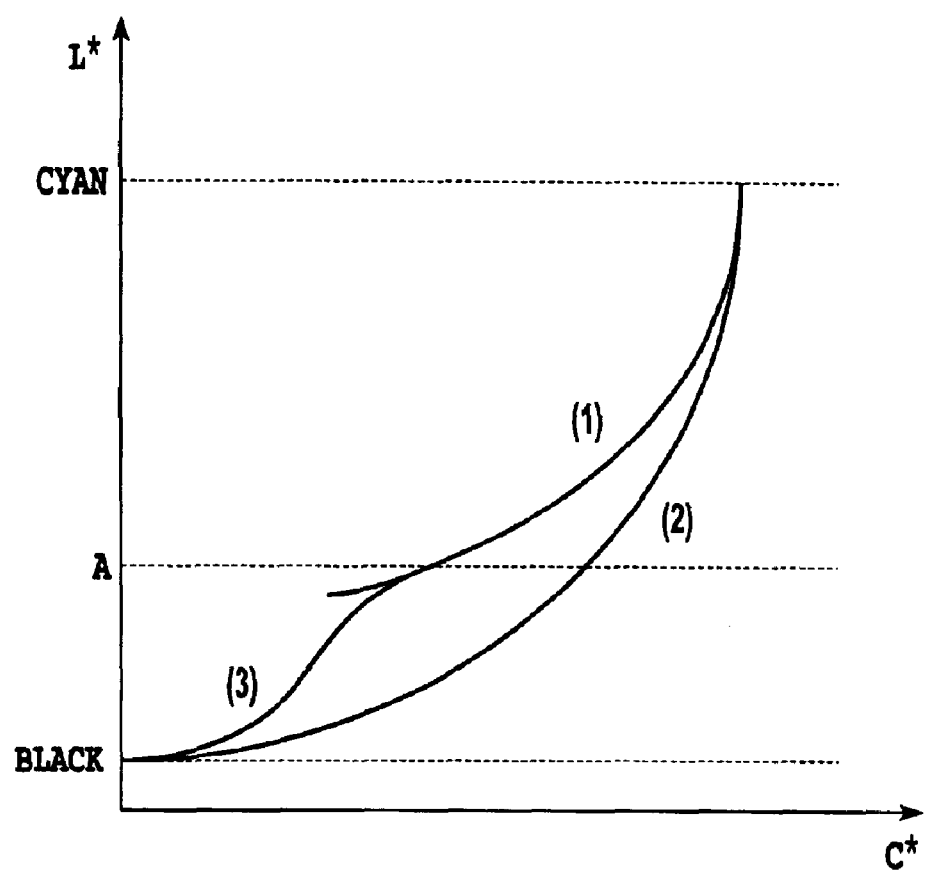
FIG. 10 is a diagram illustrating a target in an embodiment which target is used for the color separation table generating process.

In the present embodiment, first, for the area from cyan to black, in the L*C* plane shown in FIG. 10, a target with no amount of K which target is represented by a curve (1) and a target with a maximum amount of K which target is represented by a curve (2) are determined for a predetermined range of L*.

That is, in the present embodiment, the curve (1) and the curve (2) are determined within the range of the data obtained in step S503 through the colorimetric operation. Specifically, with reference to the colorimetric values (in the present embodiment, L*a*b* values) for the patches on the boundary as the maximum total color material use amount which values have been determined in step S502, the curve (1) and the curve (2) are determined so that the saturation C* is highest within this range. Thus, table data on the combinations of Y, M, C, and K determined in the next step S505 on the basis of the set target does not exceed the maximum total color material use amount.

Then, taking into account the trade-off that for the two curves, adding the color material K earlier at a point with a higher L*, i.e. at a lighter point, increases the saturation but makes the color material K more granularity, as well as other tradeoffs, a point A in the area from cyan to black is set where the color material K starts to be added. In an area from L* value represented by this set point A to black of the darkest point, a predetermined continuous functional expression such as a spline function as represented by a curve (3) is used to join the two curves smoothly. Then, this joined curve is set as the target of white→cyan→black. The targets for the respective hues thus calculated are stored in the RAM 305. If they require a larger capacity, the external storage device 308 is also utilized.

Then, in step S505, combinations of the color materials C, Y, and K are determined which realizes the targets for the respective hues, set in step S504 and saved to the RAM 305 or the external storage device 308. These combinations constitute a color separation table.

Specifically, the combinations of the color materials C, M, Y, and K are determined by selecting, for example, eight or four points that are represented by the colorimetric values of the patches close to the L*a*b* value representing each target, and interpolating the Y, M, C, and K values for these patches on the basis of a cubic interpolation or a tetrahedral interpolation. Of course, the interpolation method is not limited to the above example.

Figure 11:
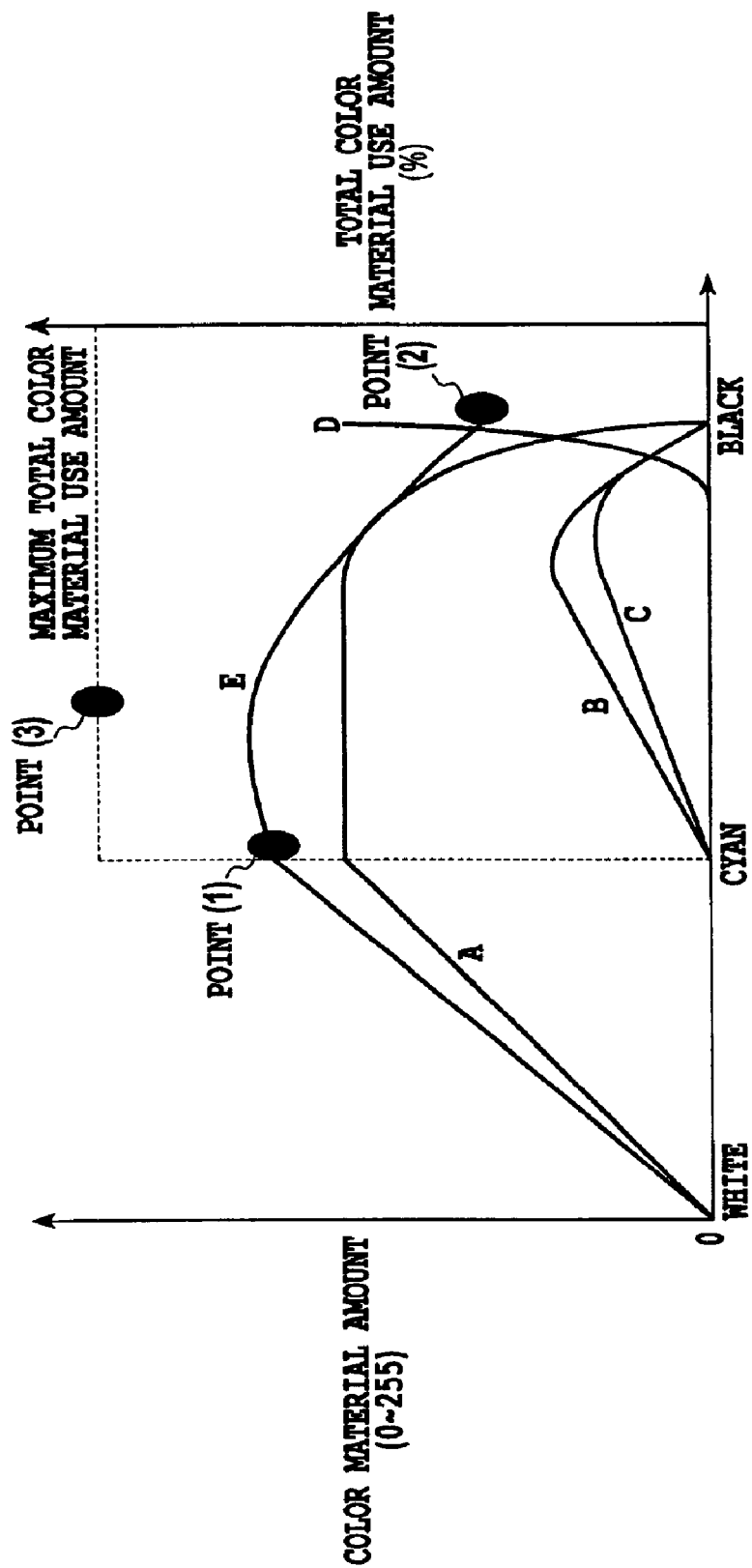
FIG. 11 is a diagram showing the amounts of color materials C, M, Y, and K and the total color material use amount for the target determined in this embodiment.

FIG. 11 is a graph showing the amounts of color materials C, M, Y, and K and the total color material use amount for the target of the hue white→cyan→black, which is one of the targets determined as described above. The axis of abscissa indicates a color changing from white through cyan to black. The axis of ordinate indicates the amounts of color materials (the amount of ink) in signal values and the total color material use amount in percentage. In this figure, A denotes the amount of C (Cyan) ink, B denotes the amount of M (Magenta) ink, C denotes the amount of Y (Yellow) ink, and D denotes the amount of K (black). These amounts of inks are in terms of signal values. E denotes the total color material use amount. Further, a point (1) indicates the total color material use amount at a color point of cyan. A point (2) indicates the total color material use amount at a color point of black. Further, a point (3) corresponds to a point on a line indicating the maximum total color material use amount within the range of cyan→black. As is apparent from this figure, for all the combinations of the basic four colors, the total color material use amount does not exceed the maximum total color material use amount in view of the ink absorbing ability of a printing medium. These combinations of C, M, Y, and K are stored in the RAM 305 so as to be used in steps S506 and S507, described below, to determine a color separation table for the basic four colors plus Lm and Lc. Then, step S505 is ended.

In step S506, when a color separation table for six colors is determined by replacing M and C, in the combinations of the basic four colors determined in step S505, with Lm and Lc or both Lm and M and both Lc and C, the total color material use amount is determined for the six color materials so as not to exceed the maximum color material use amount.

Figure 12:
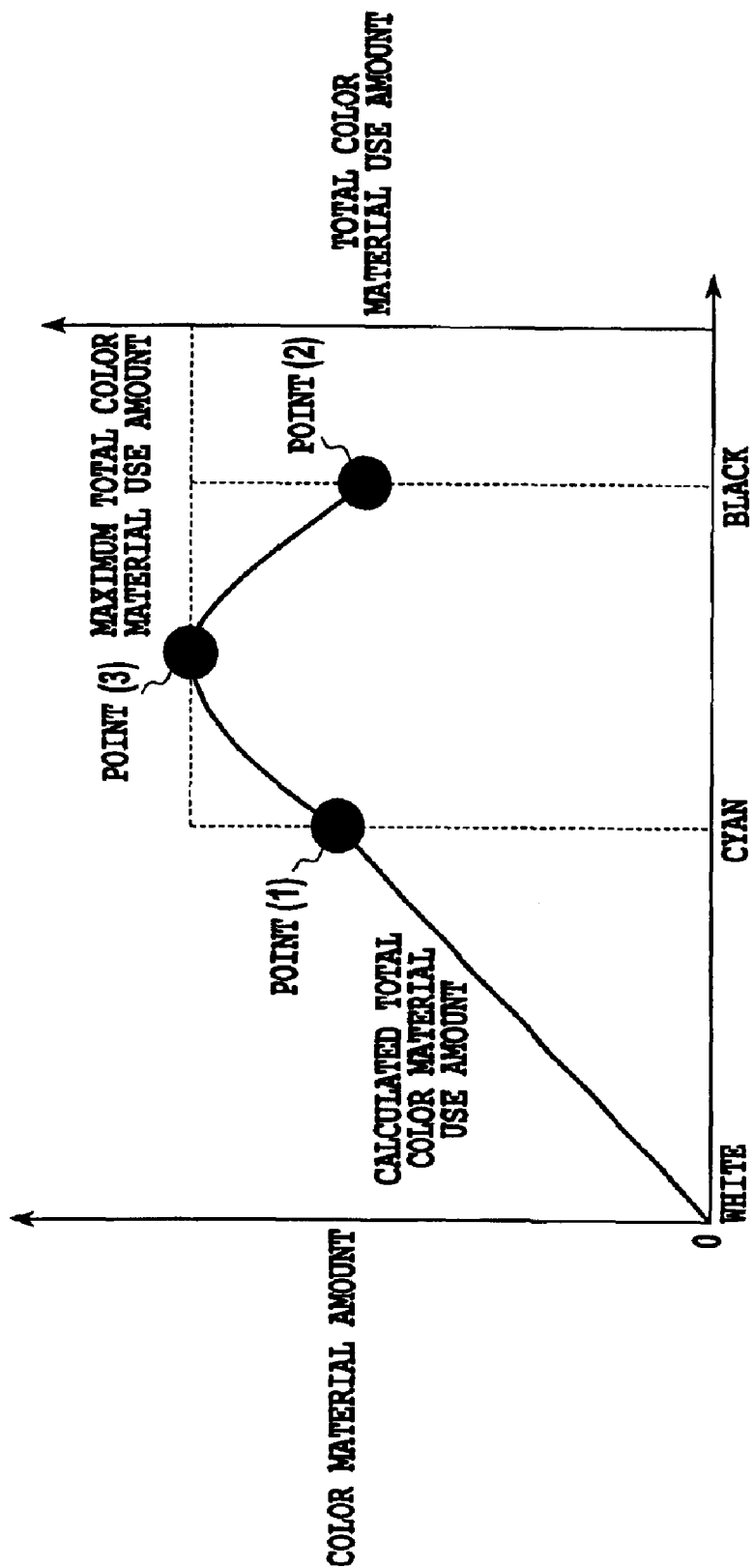
FIG. 12 is a diagram illustrating a process for determining the total color material use amount of six color materials, the six color materials including Lm, and Lc in addition to C, M, Y, K.

FIG. 12 is a diagram showing an example of the results of this calculation. A specific calculation will be described with reference to FIG. 12. With the combinations of the basic four color materials determined as described above in order to set a target for each hue, the total color material use amount E shown in FIG. 11 is used as it is, within the range of white to cyan (point (1)) in FIG. 12. This is because in the present embodiment, the target corresponds to a succession of colors of the highest saturation for each hue, so that within this range, an attempt is made to use cyan of the high concentration to reproduce a higher saturation and a light cyan is not used. Furthermore, from the cyan (point (1)), for each combination, a replacement in which all of M is replaced with Lm is carried out until the total color material use amount calculated after all of M has been replaced with Lm equals the maximum total color material use amount. Here, the point (combination) at which the total color material use amount equals the maximum total color material use amount is defined as a point (3). Thus, the total color material use amount is obtained for a curve indicated by the points (1) to (3). This is because in representing the same saturation, the amount of light cyan ink used is larger than that of cyan ink used, and with each combination, the maximum allowable use amount of cyan is determined for the curve. Furthermore, between the points (3) and (2), the total color material use amount is represented by, for example, a spline curve in order to connect smoothly to the curve between the points (1) and (3). The thus calculated data on the total color material use amount is stored in the RAM 305 for the subsequent processing. If the target is not defined as color of the highest saturation for each hue, within the range of white to cyan (point (1)), C may be partly replaced with Lc.

Then, in step S507, a 6-color color separating process is executed. That is, a relationship is determined which expresses the above described target using a combination of the six colors including the basic four colors Y, M, C, and K as well as Lm and Lc.

Figure 13:
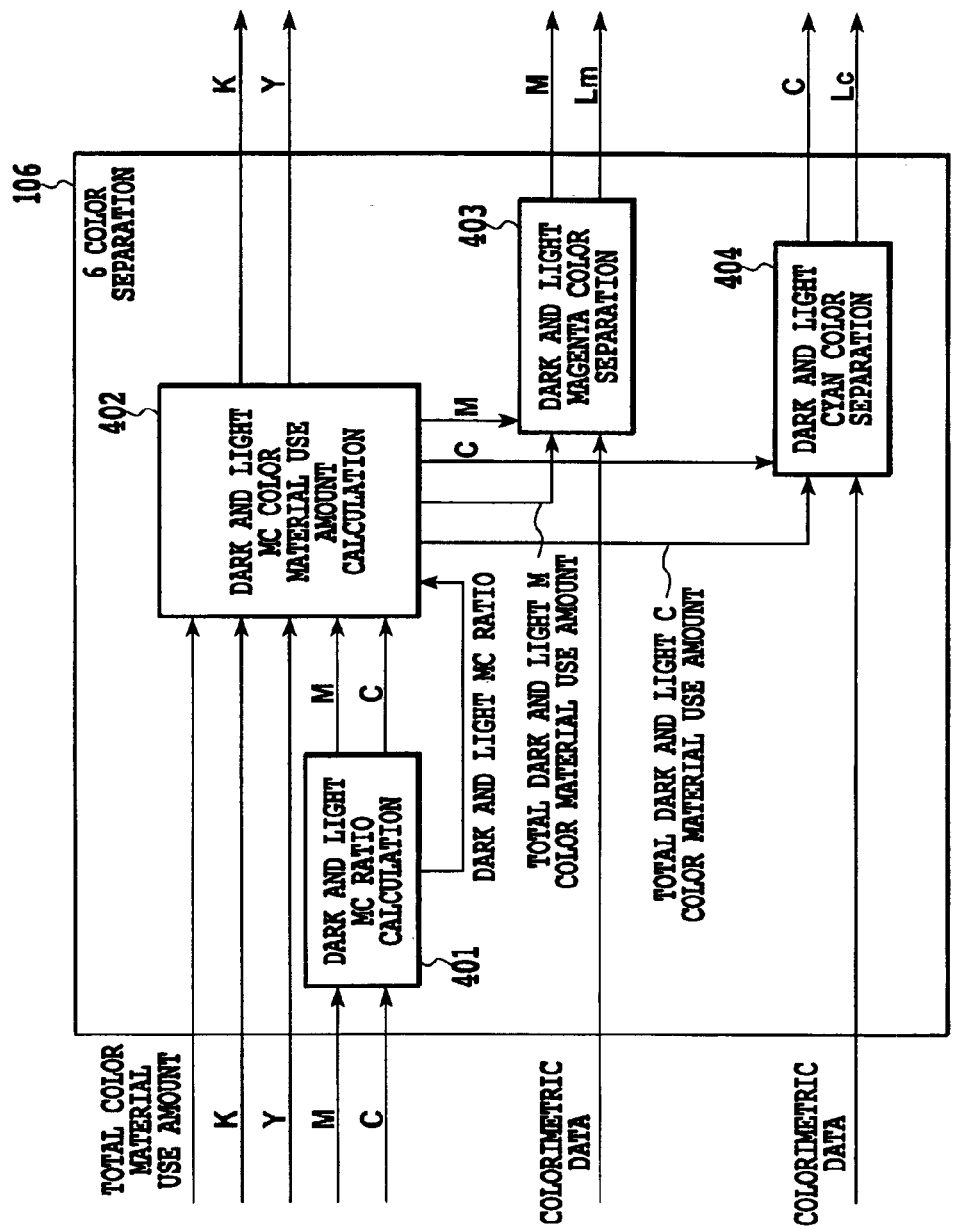
FIG. 13 is a block diagram showing the details configuration of 6-color color separation 106, shown in FIG. 1.
Figure 14:
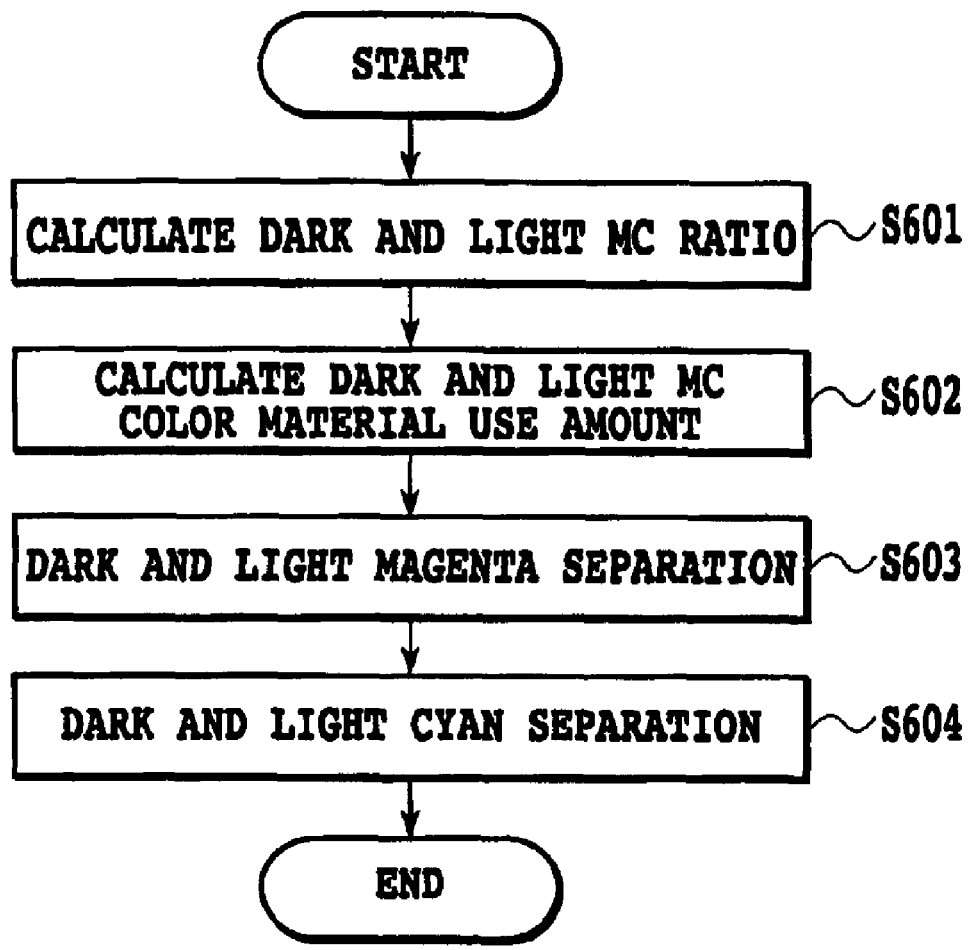
FIG. 14 is a flow chart showing a procedure of the 6-color color separating process.

FIG. 13 is a block diagram showing a detailed configuration of the 6-color color separating process 106, shown in FIG. 1. FIG. 14 is a flow chart showing a procedure of the 6-color color separating process. The 6-color color separating process will be described below with reference to these figures.

First, in step S601, a dark and light MC ratio calculating process 401 calculates a dark and light magenta ratio corresponding to a value, which is a summed amount of (dark) magenta ink M and light magenta ink Lm in the case that the magenta ink M and the light magenta ink Lm are used, and a dark and light cyan ratio corresponding to similar value of the cyan ink C and the light cyan ink Lc, on the basis of the respective percentages of M and C in each combination of Y, M, C, and K obtained through the 4-color color separation. To execute the calculation, the respective percentages of M and C in each combination of the basic four colors are used directly as the dark and light magenta ratio and the dark and light cyan ratio respectively. If the concentration ratio of M to Lm (dilution rate) is different from the concentration ratio of C to Lc, the above dark and light ratios may be calculated by weighting based on the concentration ratios. The calculated dark and light magenta ratio and dark and light cyan ratio are stored in the RAM 305 for the next process step S602.

In step S602, a dark and light MC color material use amount calculating process 402 calculates the total use amount of dark and light magenta inks and the total use amount of dark and light cyan inks by using the calculated ratios of dark an light magenta and of dark and light cyan, the total color material used amount calculated in step S506, and the color material use amounts of Y and K in the combinations of color material data in the basic 4-color color separation table determined in step S505. The total use amounts of dark and light magenta inks and of dark and light cyan inks are calculated as follows:

> Total use amount of dark and light magenta inks=(the total color material use amount−the total color material use amount of Y and K)×the dark and light magenta ratio,
>
> Total use amount of dark and light cyan inks=(the total color material use amount−the total color material use amount of Y and K)×the dark and light cyan ratio.

Then, the results of the calculation are stored in the RAM 305 for the subsequent processing.

Then, in step S603, a dark and light magenta color separating process 403 separates M in each combination into Lm or a set of M and Lm (replaces M with Lm or a set of M and Lm), on the basis of the total use amount of dark and light magenta inks in each combination determined as described above, colorimetric values for the patches composed of a combination of M and Lm which values are outputted and obtained in step S503, and signal values for M in the combinations of color material data in the 4-color color separation table.

Figure 15:
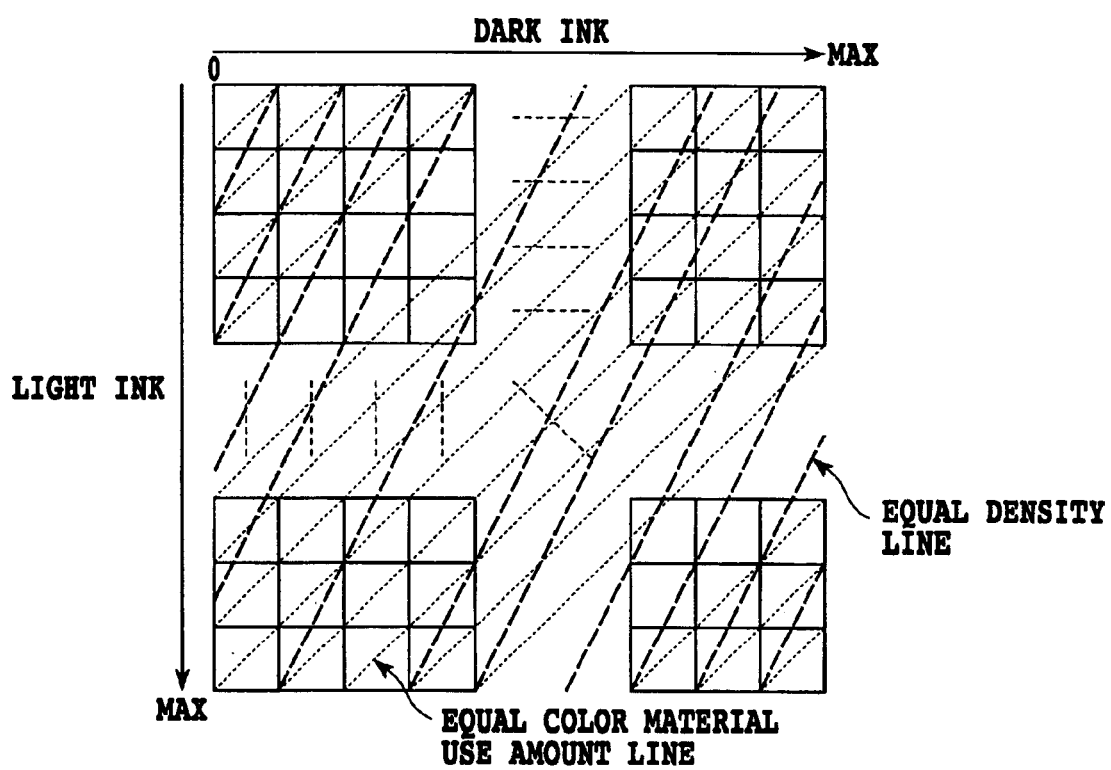
FIG. 15 is a diagram illustrating a dark and light color separating process in the 6-color color separating process.

Specifically, for the colorimetric values for each patch obtained in step S503, it is possible to, for example, as shown in FIG. 15, draw equal color material use amount lines each indicating that the total color material use amount of magenta (M) as the dark magenta and light magenta (Lm) as the light ink is equal to each other and equal density lines each indicating that the patch on the line has equal density to the density values expressed by the colorimetric values for the patches (in the uppermost row in FIG. 15) based only on M and not on Lm. Then, the signal values for Lm and M for the patch located at the intersection between the equal color material use amount line indicating the total color material use amount determined in the process described in FIG. 12 for each combination and the equal density line for the density indicated by M in that combination are set as Lm and M into which the M in that combination is separated. For each combination of color material data in the 4-color color separation table, the results of the above calculation are stored in the RAM 305 for the next processing.

Furthermore, in step S604, similarly, C in each combination is separated into Lc or a set of C and Lc (replaced with Lc or a set of C and Lc) on the basis of the total use amount of dark and light can inks, colorimetric values for the patches composed of a combination of C and Lc which values are outputted and obtained in step S503, and signal values for C in the combinations of color material data in the 4-color color separation table. This processing is similar to that in step S603. Thus, its description is omitted.

Once the processing in step S604 is finished, data on magenta and cyan subjected to dark and light separation is outputted to finish the present processing. Thus, step S507 is finished to complete a series of processes for determining a 6-color color separation table.

As described above, according to the present embodiment, the maximum total amount of color materials used is determined taking into account the characteristics of adhesion of the plural types of color materials used in an image output apparatus to output images, to print media used to output the patches. Then, patches are outputted by determining a combination of data on the plural types of color materials which data is required to output the patches, without exceeding the maximum total amount of color materials used. Then, on the basis of colorimetric values for the respective patches, a predetermined conversion relationship such as a color separation table is determined which is associated with generation of data for plural types of color materials including a plurality of color materials having the same color but different concentrations. Accordingly, this conversion relationship is based on the colorimetric values for the patches which are appropriately outputted in terms of the characteristics of adhesion of ink or toner to print media. Therefore, this conversion relationship accurately reflects the color output characteristics of the image output apparatus.

As a result, the conversion relationship can be obtained accurately which is associated with generation of data for plural types of color materials including a plurality of color materials having the same color but different concentrations. Further, a printing operation can be performed while making a color space composed of the plural types of color materials the greatest extent.

(Second Embodiment)

In a second embodiment of the present invention, the total use amount of color materials such as ink is set as a defined value defined so as not to exceed the above described maximum total color material use amount. Then, a color separation table is determined without exceeding this defined amount. Thus, for example, when the user sets a defined total color material use amount as the defined value, a printing operation can be performed in which the consumption of color materials such as ink or toner is restricted, while making the best of a color space composed of plural types of color materials within the range of the restricted consumption.

Figure 16:
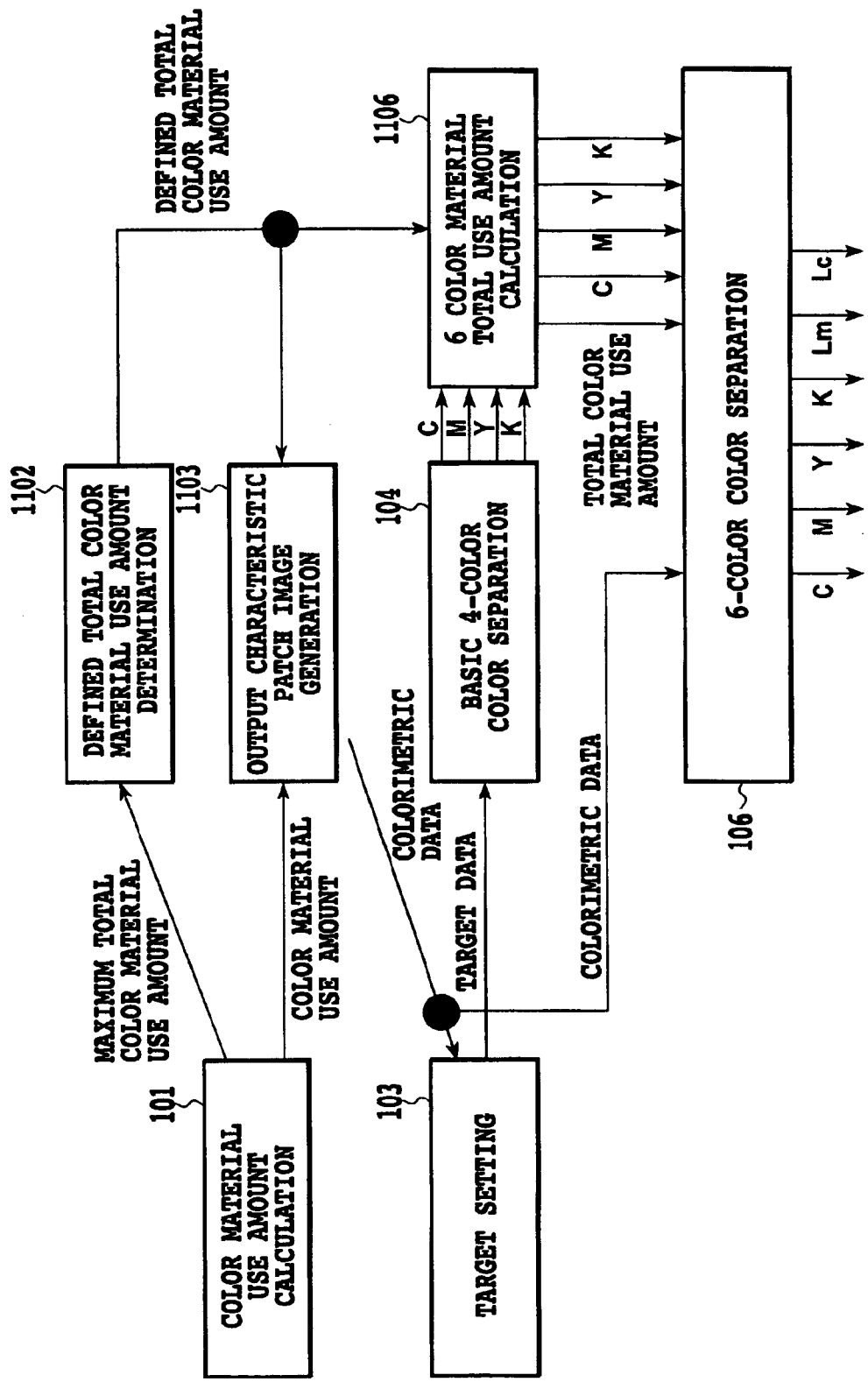
FIG. 16 is a block diagram showing an image processing configuration in a color printer according to a second embodiment of the present invention.

FIG. 16 is a block diagram showing an image processing configuration in a color printer according to the present embodiment. FIG. 16 is similar to FIG. 1 according to the first embodiment. The second embodiment is essentially different from the first embodiment in a defined total color material use amount determining process 1102, an output characteristic patch image generating process 1103, and a 6 color material total use amount calculating process 1106. These processes are executed in accordance with the above described defined total color material use amount. This difference will mainly be described below.

The defined total color material use amount determining process 1102 determines a defined total color material use amount with reference to the maximum total color material use amount calculated as described in FIG. 1 and in accordance with a set value set by the user or the like so as not to exceed the maximum total color material use amount. For example, the user uses a printer driver in a computer to input the set value on a display so that a defined total color material use amount is calculated correspondingly to this set value information.

Further, the output characteristic patch image generating process 1103 uses the defined total color material use amount calculated by the defined total color material use amount determining process 1102, and the color material use amounts of the four inks Y, M, C, and K calculated by the color material use amount calculating process 101, to generate data for patches, which can be printed without causing the ink to overflow (that is, the ink cannot be absorbed). Then the patches printed based on the patch data are subjected to a colorimetric process and the colorimetric data is obtained as data for a color space represented in terms of L*a*b*, which can be reproduced by a printer.

Furthermore, a 6-color material total use amount calculating process 1106 calculates the total color material use amounts of dark and light inks M, C, Lm, an Lc with reference to the defined total color material use amount on the basis of the combination of the four colors Y, M, C, and K determined by the basic 4-color color separating process 104. The 6-color color separating process 106 creates a color separation table corresponding to a combination of six colors Y, M, C, K, Lm, and Lc, on the basis of the total color material use amount and the colorimetric data.

Figure 17:
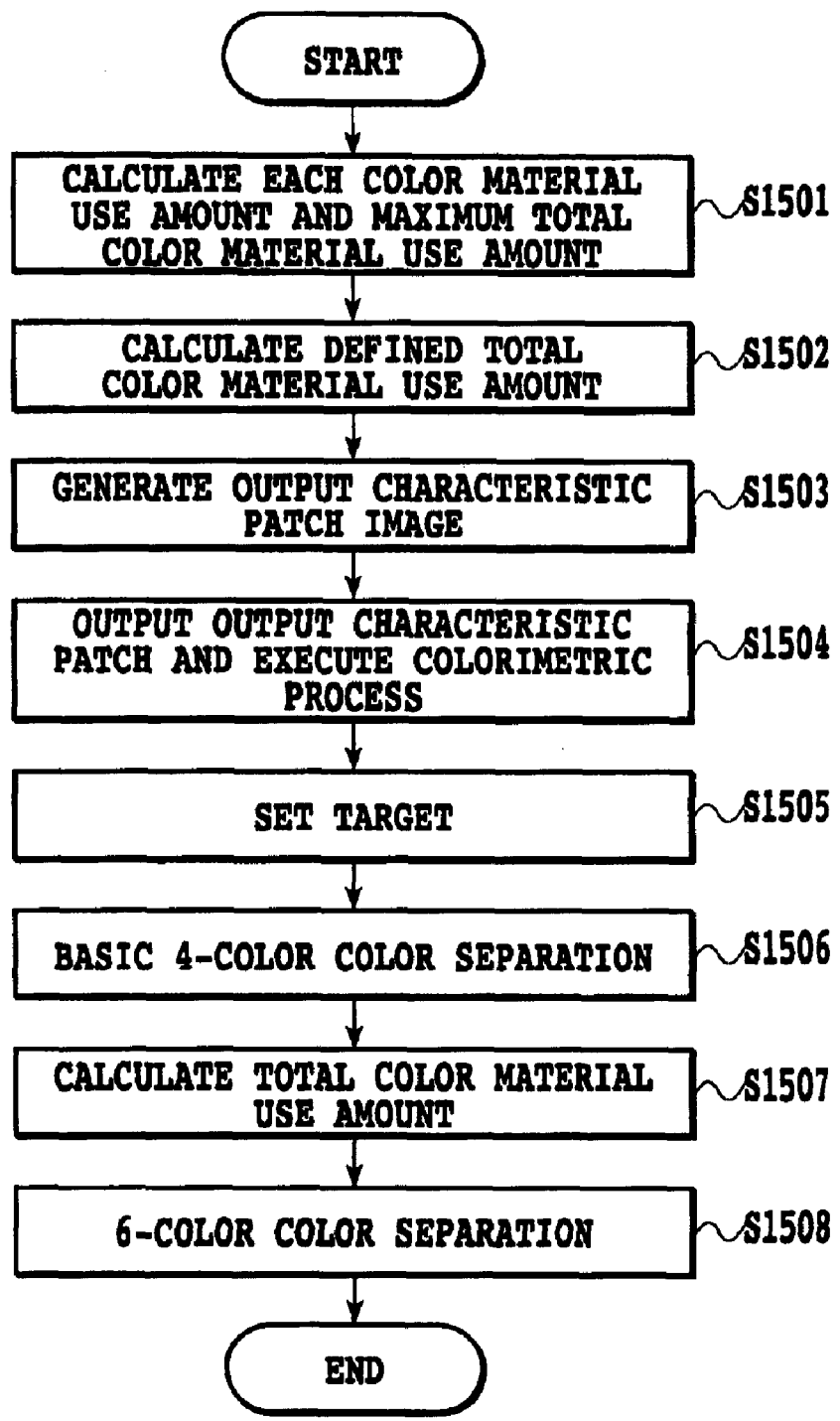
FIG. 17 is a flow chart showing a procedure of the image processing shown in FIG. 16, specifically a color separation table creating process executed by the configuration shown in FIGS. 2 and 3.

FIG. 17 is a flow chart showing a procedure of the image processing shown in FIG. 16, specifically a color separation table generating process executed by the configuration shown in FIGS. 2 and 3. The processing shown in FIG. 17 is similar to that shown in FIG. 4 for the above described first embodiment. A substantial difference from the first embodiment is that a defined total color material use amount is calculated in step S1502. In the present embodiment, with reference to the defined total color material use amount instead of the maximum total color material use amount in the first embodiment, patches are subsequently generated and on the basis of these patches, a 6-color color separation table is generated. This difference will mainly be described below.

Specifically, in step S1502, the defined total color material use amount is determined so as to be within the maximum total color material use amount calculated in step S1501. The defined total color material use amount is determined in a manner that the defined color material use amount is, for example, determined at 150% in the case that the maximum total color material use amount is 200%, and for this determination the defined total color material use amount is calculated in accordance with set information set by a user or a serviceman through the printer driver in the computer. This arrangement allows an ink consumption amount to be restricted while a quality of inputted image may be decreased a little. As a result, the ink consumption that makes up a greater part of a running cost of a printer can be restricted and the running cost of the printer can be decreased. It is apparent from the description below that at the smaller rate the defined total color material use amount is determined to the maximum total color material use amount, the smaller the ink consumption becomes.

Instead determining the defined total color material use amount in accordance with information set by the user or the like as with the above example, software such as a print driver may automatically determine one in accordance with the type of an image to be printed. Further, if the defined total color material use amount determined in accordance with the value set by the user or the like exceeds the maximum total color material use amount, then of course, this defined total color material use amount is inhibited from being determined. The user or the like is then notified of this.

Then, in step S503, the output characteristic patch image generation process 103 (FIG. 16) is executed to generate patches while avoiding ink overflow.

Figure 18:
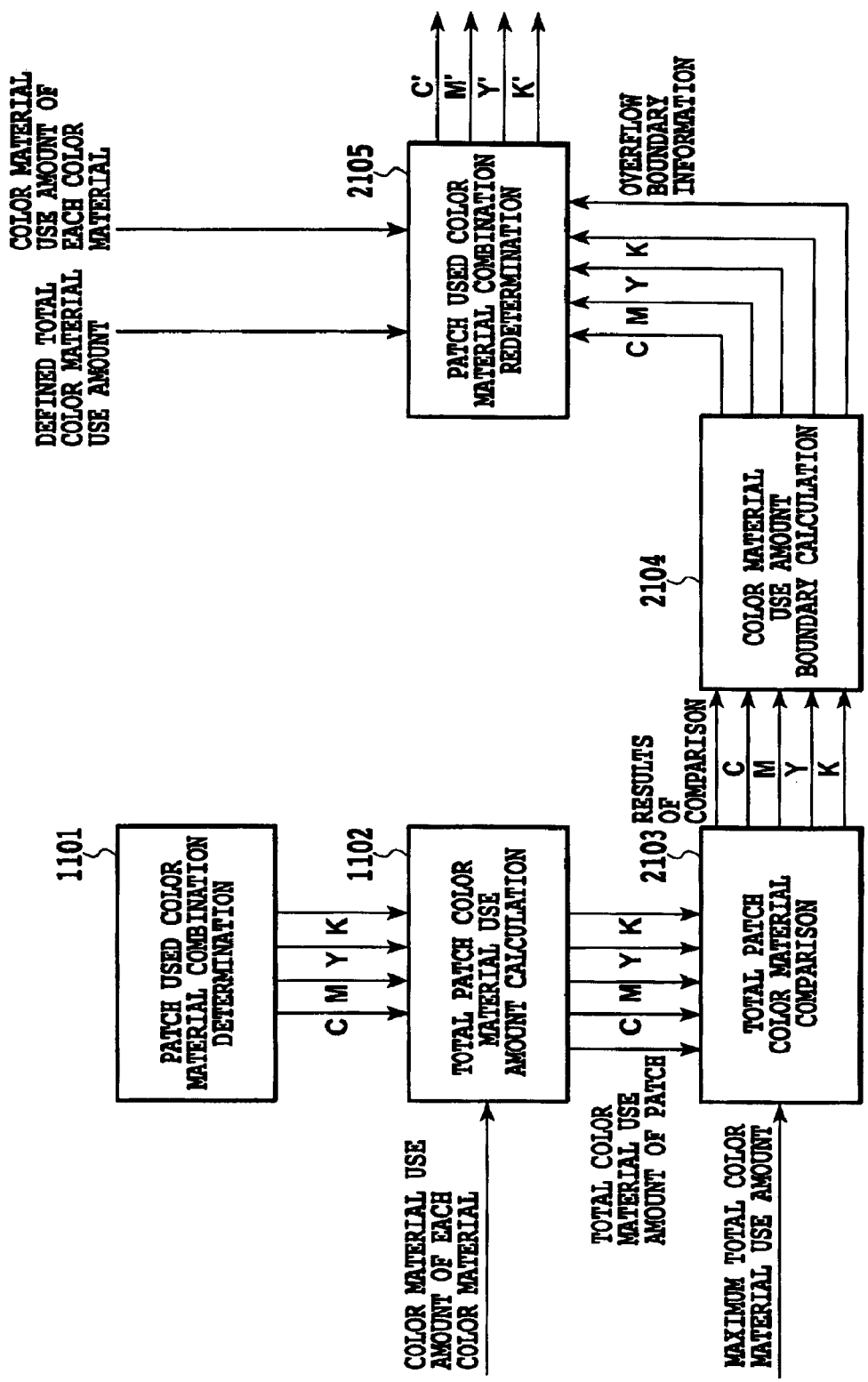
FIG. 18 is a block diagram showing the details of the output characteristic patch image generating process shown in FIG. 16.
Figure 19:
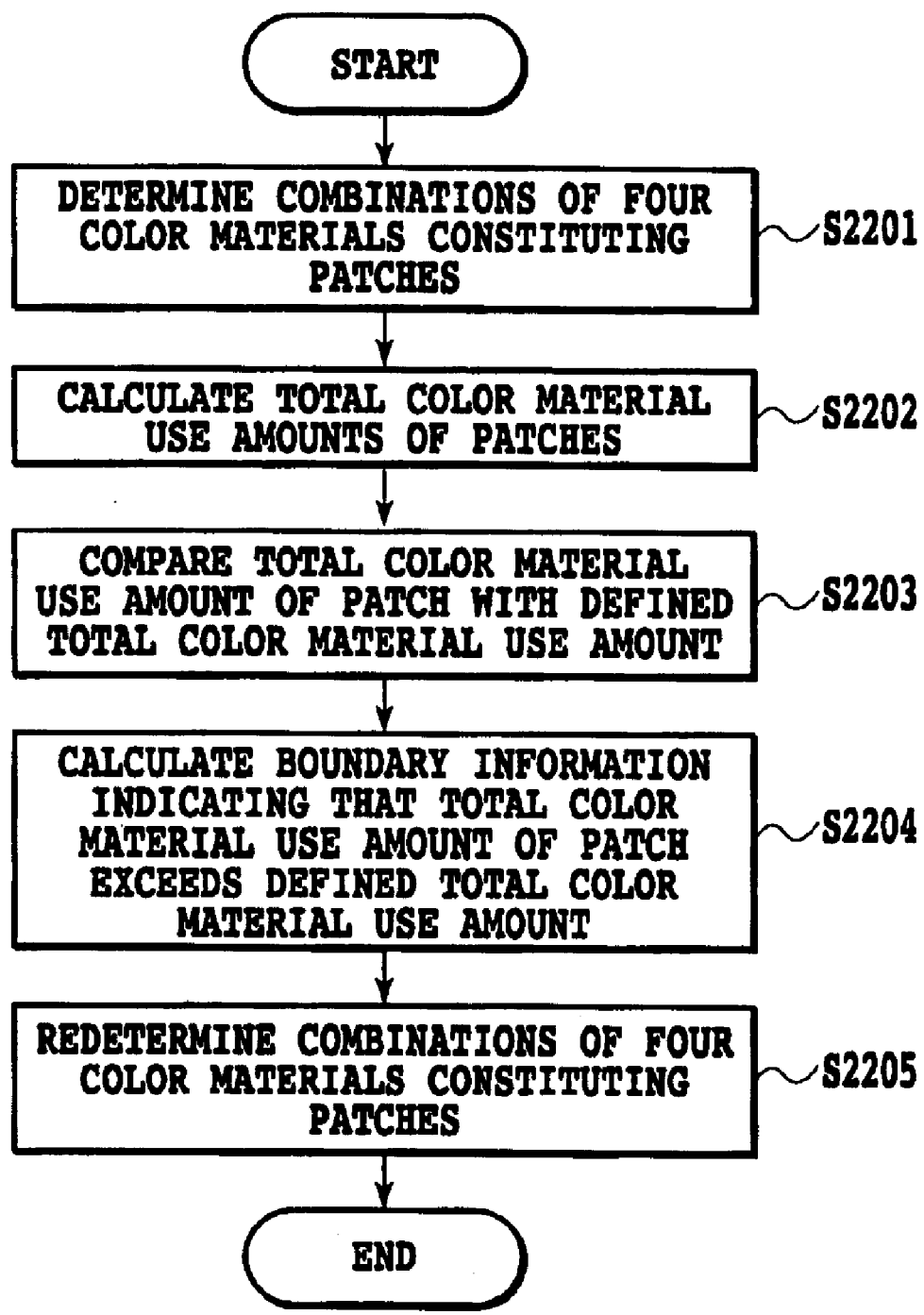
FIG. 19 is a flow chart showing the details of procedure of the output characteristic patch image generating process.

FIG. 18 is a block diagram showing the details of the output characteristic patch image generating process 1103. FIG. 19 is a flow chart showing the procedure thereof, that is, the details of procedure of the processing executed in step S1503 in FIG. 17. The output characteristic patch image generating process 1103, shown in FIGS. 18 and 19, is different from the processing according to the first embodiment shown in FIG. 5, in a total patch color material use amount comparing process 2103, a total color material use amount boundary calculating process 2104, and a patch used color material redetermining process 2105.

Specifically, in step 2203, a total patch color material use amount comparing process 2103 is executed to compare the total color material use amount of each combination calculated in step S2202 with the maximum total color material use amount calculated in step S1502 to determine whether or not the total color material use amount of that combination exceeds the defined total color material use amount. Information on whether or not the total color material use amount of that combination exceeds the defined total color material use amount is stored in the RAM 305 with the information made correspond to that combination.

Then, in step S2204, a total color material use amount boundary calculating process 2104 collects combinations determined to exceed the defined total color material use amount and for each combination, calculates the amount of each of C and M exceeding the defined total color material use amount. Furthermore, a compression rate for patch data used in the next step S2205 is calculated as boundary information and stored in the RAM 305. That is, this compression rate is determined so that the signal values for the patch (point B in FIG. 20, described later) having the largest amount exceeding the defined total color material use amount is compressed and do not exceed the defined total color material amount (in the present embodiment, the signal values are equal to the maximum total color material amount). This compression rate corresponds to the ratio of a distance OB' to a distance OB. Then, in the next step S2205, the data on all the patches is uniformly compressed using this compression rate.

Figure 20:
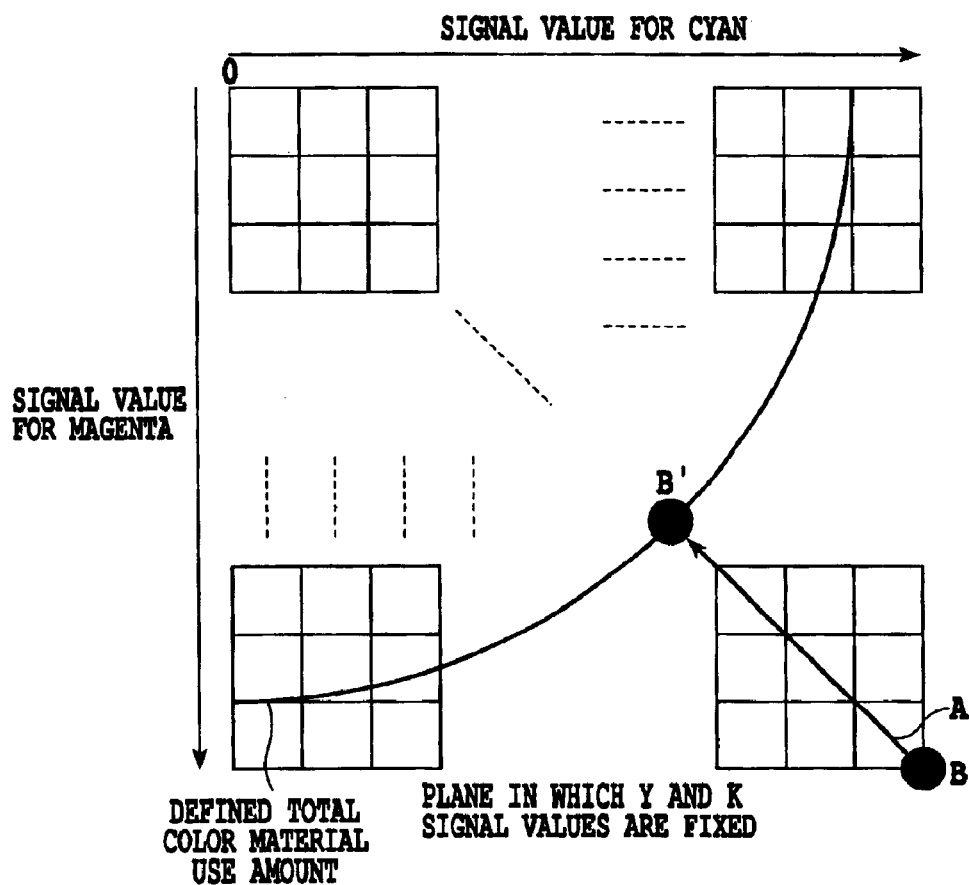
FIG. 20 is a diagram of patches showing a boundary for the defined total color material use amount which is determined by the patch image generating process.

FIG. 20 is a diagram of patches showing a boundary for the defined total color material use amount determined as described above. This figure shows the patches generated by combining the basic 4 colors together and changing the signal values for the inks C and M while fixing the signal values for the inks Y and K. Further, in this figure, the smallest squares each represents one patch, with the illustration of patches in an intermediate portion omitted.

The boundary between an area in which the total color material use amount exceeds the calculated defined total color material use amount and an area in which the total color material use amount does not exceed the defined total color material use amount is represented as a line for the defined total color material use amount drawn as a quarter circumference in the figure. This line is represented as a circumference for the convenience of description and illustration. However, actually, the boundary line corresponds to the case in which a value for the ink (color material) use amount into which the sum of the signal values for the inks(Y, K) C and M has been converted equals the given defined total color material use amount. For example, if the signal values for the inks C and M are converted into ink use amounts at the same rate, then this line is straight.

When the inks Y and K have relatively large signal values, then the total color material use amount is large as a whole. Accordingly, the line of the defined total color material use amount appears on patch data as shown in the figure. Specifically, when the C and/or M, constituting the patches, has a lager signal value than the line of the defined total color material use amount for C and/or M, the patch printed based on the combination of these signals is not accurately printed because of possible ink overflow as well as an ink consumption is not appropriately restricted. Thus, in the present embodiment, in the next step S2205, the signal values for all the patches are uniformly compressed so that the total color material use amounts for all patches have values inside the above line.

Figure 21:
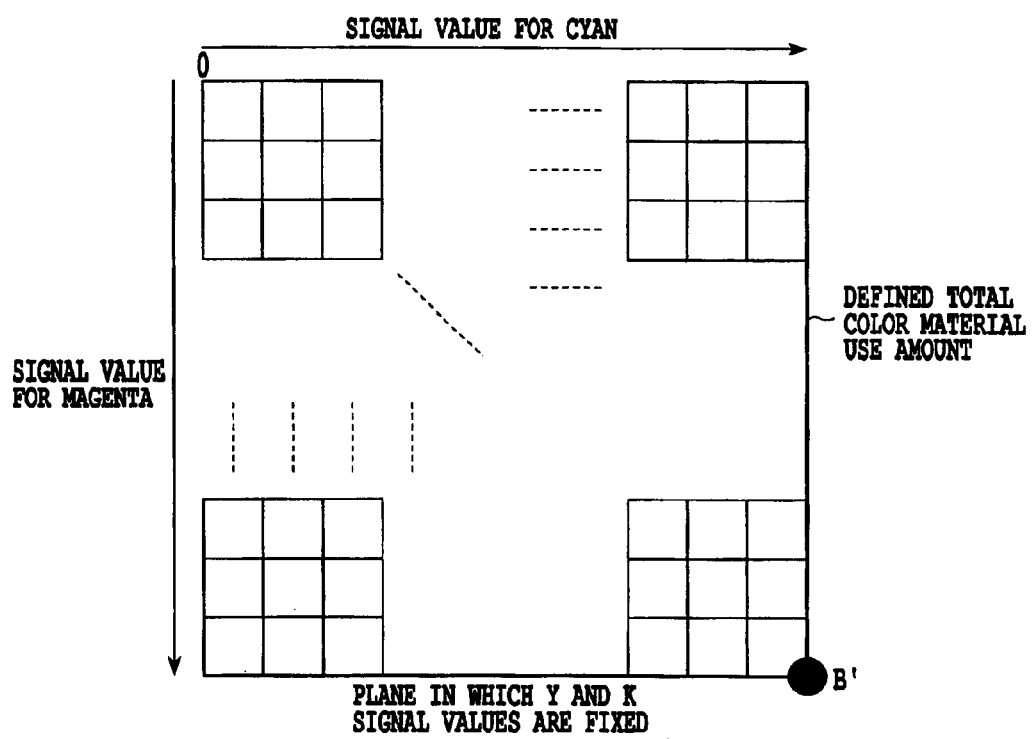
FIG. 21 is a diagram of patches showing the results of a patch data compressing process based on information on the boundary for the defined total color material use amount in the color separation table generating process.

More specifically, in step S2205, a patch used color material combination redetermining process 2105 compresses M and C values for all the patches in accordance with the compression rate calculated in step S2204. With the above process, a point B, shown in FIG. 20 and most markedly exceeding the defined total color material use amount, is compressed in the direction of arrow A toward the origin, to a point B'. The values for the other patches are compressed at the same compression rate. Thus, as shown in the patch image in FIG. 21, the total color material use amounts for all the patches in the patch image are adjusted so as not to exceed the defined total color material use amount.

In the above compression process, the combinations of the basic 4 colors are redetermined to finish step S1503. As a result of this step, none of the printed patches exceed the defined total color material use amount, and therefore proper patches can be printed without causing ink overflow or the like.

Figure 22:
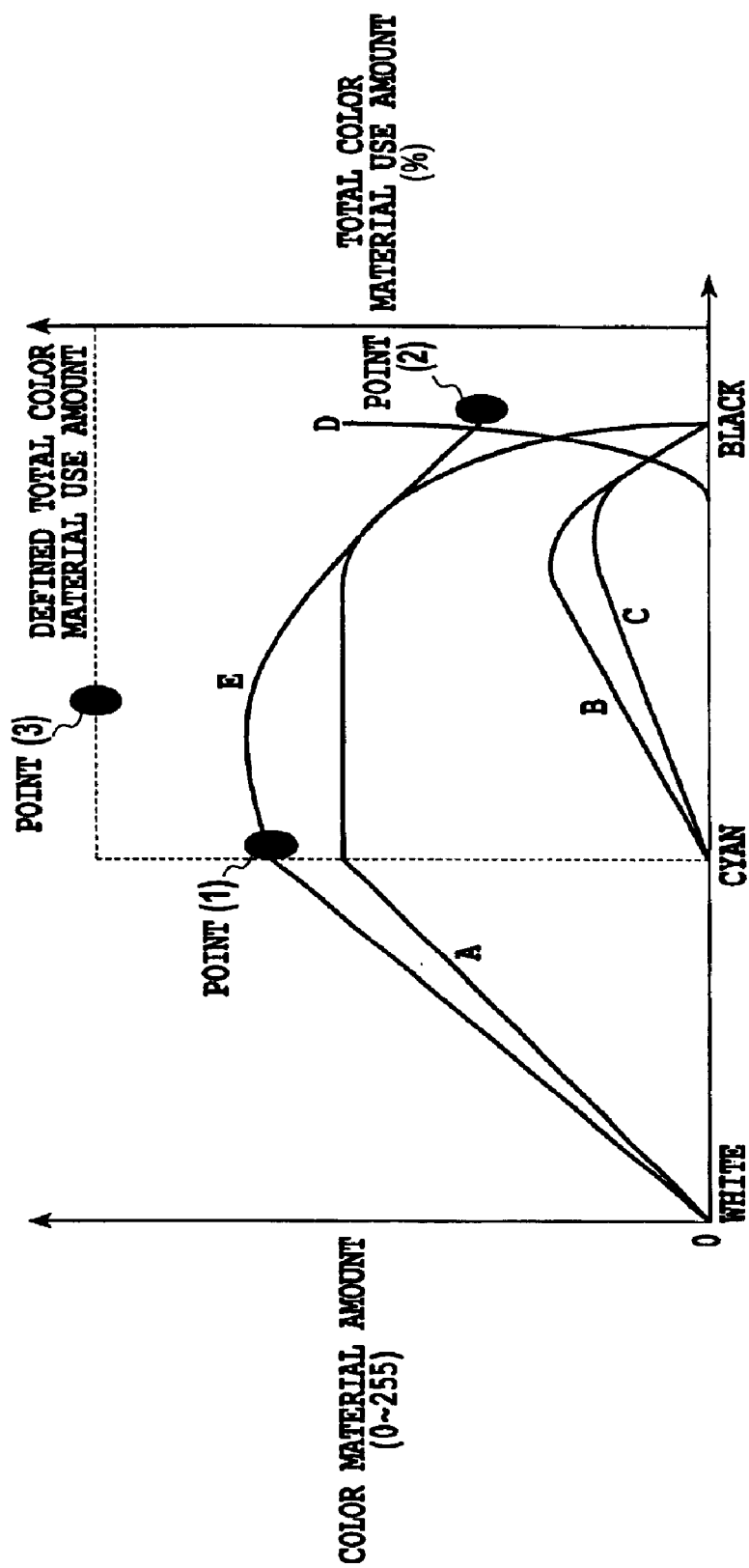
FIG. 22 is a diagram showing the amounts of color materials C, M, Y, and K and the total color material use amount for the target determined in this embodiment.

FIG. 22 is a graph showing the amounts of color materials C, M, Y, and K and the total color material use amount for the target of the hue white→cyan→black, which is one of the targets determined in step S1505. The axis of abscissa indicates a color changing from white through cyan to black. The axis of ordinate indicates the amounts of color materials (the amount of ink) in signal values and the total color material use amount in percentage. In this figure, A denotes the amount of C (Cyan) ink, B denotes the amount of M (Magenta) ink, C denotes the amount of Y (Yellow) ink, and D denotes the amount of K (black). These amounts of inks are in terms of signal values. E denotes the total color material use amount. Further, a point (1) indicates the total color material use amount at a color point of cyan. A point (2) indicates the total color material use amount at a color point of black. Further, a point (3) corresponds to a point on a line indicating the defined total color material use amount determined in step S1502 within the range of cyan→black. As is apparent from this figure, for all the combinations of the basic four colors, the total color material use amount does not exceed the defined total color material use amount in view of the restriction of ink consumption. These combinations of C, M, Y, and K are stored in the RAM 305 so as to be used in steps S1507 and S1508, described below, to determine a color separation table for the basic four colors plus Lm and Lc. Then, step S1506 is ended.

In step S1507, when a color separation table for six colors is determined by replacing M and C, in the combinations of the basic four colors determined in step S1506, with Lm and Lc or both Lm and M and both Lc and C, the total color material use amount is determined for the six color materials so as not to exceed the defined color material use amount.

Figure 23:
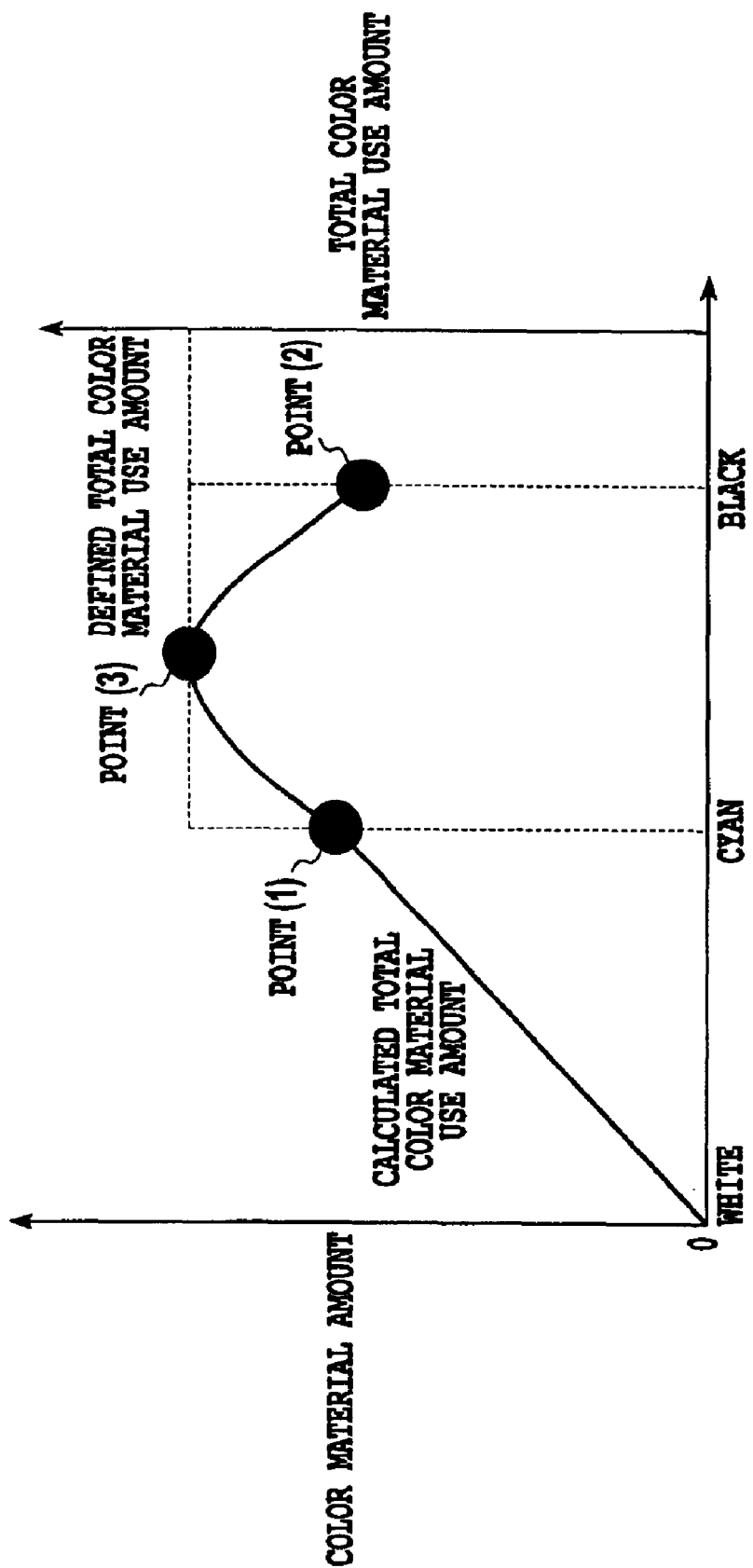
FIG. 23 is a diagram illustrating a process for determining the total color material use amount of six color materials, the six color materials including Lm, and Lc in addition to C, M, Y, K.

FIG. 23 is a diagram showing an example of the results of this calculation. A specific calculation will be described with reference to FIG. 23. With the combinations of the basic four color materials determined as described above in order to set a target for each hue, the total color material use amount E shown in FIG. 22 is used as it is, within the range of white to cyan (point (1)) in FIG. 23. Furthermore, from the cyan (point (1)), for each combination, a replacement in which all of M is replaced with Lm is carried out until the total color material use amount calculated after all of M has been replaced with Lm equals the defined total color material use amount. Here, the point (combination) at which the total color material use amount equals the defined total color material use amount is defined as a point (3). Thus, the total color material use amount is obtained for a curve indicated by the points (1) to (3). This is because in representing the same saturation, the amount of light cyan ink used is larger than that of cyan ink used, and with each combination, the maximum allowable use amount of cyan is determined for the curve. Furthermore, between the points (3) and (2), the total color material use amount is represented by, for example, a spline curve in order to connect smoothly to the curve between the points (1) and (3). The thus calculated data on the total color material use amount is stored in the RAM 305 for the subsequent processing.

Finally, in step S1508, a 6-color color separating process is executed. That is, a relationship is determined which expresses the above described target using a combination of the six colors including the basic four colors Y, M, C, and K as well as Lm and Lc. Then, the present procedure is completed.

(Third Embodiment)

In the first and second embodiment, first, the basic four colors are processed so that their combinations do not exceed the maximum total color material use amount or the defined total color material use amount (steps S501 to S502 in FIG. 4 and steps S1501 to S1503 in FIG. 17). Then, on the basis of colorimetric values for patches of the combinations, a color separation table for the four colors is generated (steps S503 to S505 in FIG. 4 and steps S1504 to S1506 in FIG. 17). Then, on the basis of the 4-color color separation table, a 6-color color separation table is generated so that combinations of the six color materials in this table do not exceed the above maximum use amount. However, the application of the present invention is not limited to such processing. A color separation table for the six colors may be directly determined by generating patch data for the six color materials (this processing is similar to step S502 in FIG. 4 or step S1503 in FIG. 17) and then executing similar processing (steps S503 to S505 in FIG. 4, step S1504 to S1506 in FIG. 17). In this case, with a configuration in which 8 bit data is divided into eight levels for each color, the sixth-power-of-eight combinations are required to set patch data for the six color materials.

(Fourth Embodiment)

In the first and second embodiments, for dark and light magenta separation and dark and light cyan separation carried out in steps S603 and S604, respectively, the density values included in the colorimetric values obtained from the outputted M and C signal values outputted as a result of 4-color color separation. The present invention is not limited to this aspect. That is, lightness values (L*) may be used in place of the density values. Of course, in this case, for patches such as those shown in FIG. 15, by drawing equal brightness lines, the solution of dark and light separation is obtained on the basis of each intersection.

(Fifth Embodiment)

The present embodiment relates to image processing associated with the actual generation of printing data using the color separation table for the color translation, obtained in the first, second third of fourth embodiment, described above.

Specifically, on the basis of the 4-color separation table data for each of the six hues, obtained in the first to fourth embodiments, a predetermined interpolating method is used to determine combinations of the color material signals C, M, Y, and K which correspond to L*a*b* values defining lattice points in the table or R, G, and B values corresponding to the L*a*b* values. The combinations are then stored in the ROM 304 or the like as a LUT (Look-Up Table).

The combinations may also be stored in the external storage 308, the CD drive 310 or FD drive 311, or external equipment. In the case of the external equipment, the RAM 305 is caused to call this equipment via the transmission equipment 314 such as the modem or network card.

Figure 24:
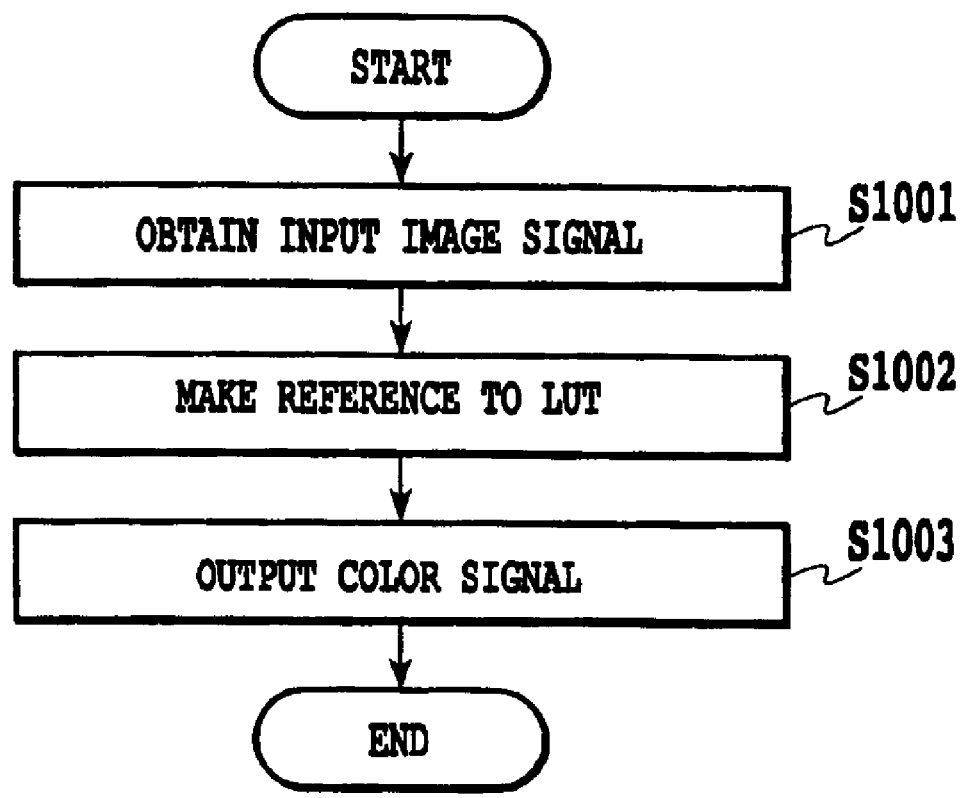
FIG. 24 is a flow chart showing a procedure for image processing using a color separation table generated in this embodiment.
Figure 25:
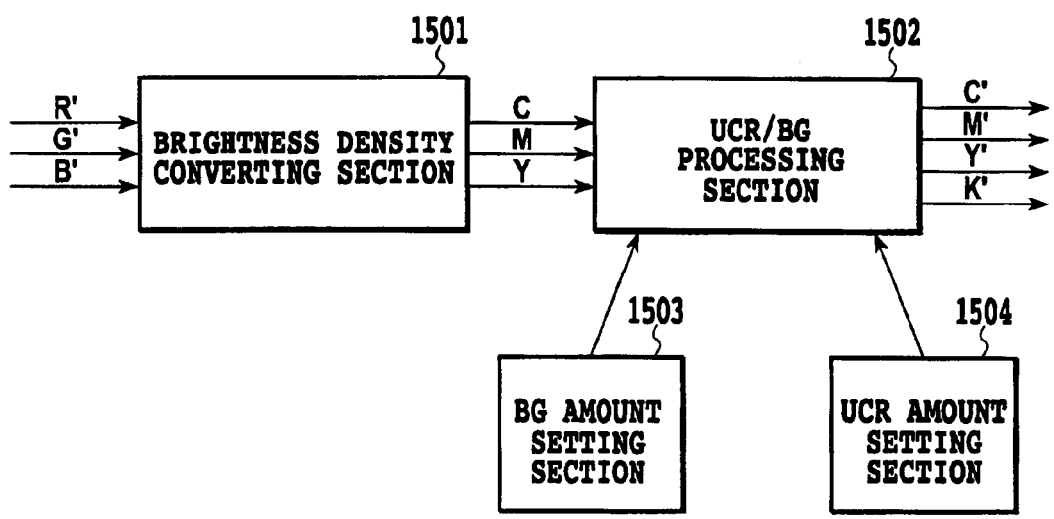
FIG. 25 is a block diagram showing an example of a conventional image processing configuration.

FIG. 24 is a flow chart showing a procedure of image processing using the color separation table generated as described above.

In this figure, first, at step S1001, an input image signal is obtained. The input image signal may be inputted by using the spectrophotometer 201, shown in FIG. 3, connecting a color image scanner or the like to the connection I/O 302 to the image input apparatus, or using the external storage device 308, the CD drive 310, or the FD drive 311. In this case, the input image signal is color information such as R, G, and B values, L*a*b* values, or the like. The inputted input image signal is temporarily stored in the RAM 305.

Then, in step S1002, the optimum combination of the color material signals which corresponds to the inputted input image signal is determined with reference to the above LUT, called by the RAM 305.

Then, in step S1003, the optimum combination of the color material signals which maximally represents the saturation of the input image signal is outputted via the RAM 305 and supplied to the printer 204 as a print signal. Once step S1003 is ended, the present process is finished.

In the above embodiments, ink has been described as an example of the color materials. However, as is apparent from the above description, the present invention is similarly applicable to other color materials, e.g. toner used in the electro-photographic method.

(Other Embodiment)

Further, the present invention is not limited to an apparatus and a method realizing the above described embodiments. Embodiments are also included in the category of the present invention, wherein program codes of software, which realize the above described embodiments, are supplied to a computer in an apparatus or a system connected to various devices to operate these devices so as to implement the functions of the above described embodiments, so that the various devices are operated in accordance with the programs stored in the computer (CPU or MPU) of the system or apparatus.

In this case, the program codes of the software themselves shown in FIGS. 4, 6, 14, 17, 19, and 24 implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments. Further, any configuration including at least one of various features described above is included in the range of the present invention.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An image processing method for determining a conversion relationship by using patches, the conversion relationship relating to a generation of color material data for an image output apparatus that outputs an image by using a plurality of kinds of color material including a plurality of color materials of a same color but differing in concentration, said method comprising the steps of:

providing a maximum total color material use amount which is determined by taking into account an adhesion characteristic of each of the plurality kinds of color material to a printing medium used when the image output apparatus outputs the patches;

determining, for each of the patches, a combination of data for the plurality of kinds of color material constituting a patch within a range of the maximum total color material use amount; and determining a predetermined conversion relationship relating to the generation of color material data of the plurality of kinds of color material including a plurality of color materials of a same color but differing in concentration, on the basis of colorimetric values of the patches which are outputted based on the determined combinations of data for the plurality of kinds of color material for the patches.

2. An image processing method as claimed in claim 1, further comprising the step of determining a defined total color material use amount within the range of maximum total color material use amount, and wherein said step of determining the combination of data determines the combination of data for the plurality of kinds of color material within a range of the defined total color material use amount.

3. An image processing method as claimed in claim 1, further comprising the step of obtaining information on determining the defined total color material use amount, the information being previously set, and wherein said step of determining the defined total color material use amount determines the defined total color material use amount in accordance with the information.

4. An image processing method as claimed in claim 1, wherein said step of determining the combination of data determines the combination of data for the plurality of kinds of color material including only a color material having a higher concentration among the plurality of color materials of the same color but differing in concentration, and said step of determining the predetermined conversion relationship separates the data for the color material having higher concentration to make data for the plurality of color materials of the same color but differing in concentration so that the predetermined conversion relationship relating to the generation of the color material data for the plurality of kinds of color material is determined.

5. An image processing method as claimed in claim 4, wherein colors of the plurality of kinds of color material are yellow, magenta, cyan and black, and the color materials of magenta and cyan are separated so that the predetermined conversion relationship for generating data for six kinds of color material is determined.

6. An image processing method as claimed in claim 4, wherein colors of the plurality kinds of color material are yellow, magenta, cyan, black, and light magenta having a lower concentration than the magenta and light cyan having a lower concentration than cyan.

7. An image processing method as claimed in claim 4, wherein said step of determining the predetermined conversion relationship determines a ratio of each the color materials having the same color but differing in concentration on the basis of the combinations of color material data for the plurality of kinds of color material, for each of the patches;

determines a total use amount of each the color materials having the same color but differing in concentration, on the basis of the determined ratio of each the color materials having the same color, the total use amount of the plurality of kinds of color material including all of the color materials having the same color but being different in concentration and a use amount of color materials excluding the color materials having the same color but differing in concentration from the plurality of kinds of color material; and separates the color material data for the color materials having a higher concentration to generate color material data for each of the color materials having the same color but differing in concentration, on the basis of the total use amount of each the color materials having the same color, a colorimetric value of the patches outputted for the combinations of the color materials having the same color but differing in concentration.

8. An image processing method as claimed in claim 1, wherein said step of determining the combination of color material data determines data for the plurality of kinds of color material including all of the plurality of color materials of the same color but differing in concentration.

9. An image processing method as claimed in claim 1, wherein the predetermined conversion relationship is determined in accordance with a condition that a target color is a color having a highest saturation for each of six hues of yellow, magenta, cyan, red, green and blue.

10. An image processing method as claimed in claim 9, wherein the target colors in six hues of yellow, magenta, cyan, red, green and blue are colors changing in an $L^*C^*$ plane from white to black through yellow, from white to black through magenta, from white to black through cyan, from white to black through red, from white to black through green, and from white to black through blue, respectively.

11. An image processing method as claimed in claim 10, wherein the target color is determined as a line in the $L^*C^*$ plane which is formed by joining a target line that does not include black onto a target line that include black maximally by means of a continuous function from a predetermined point on a $L^*$.

12. An image processing method as claimed in claim 1, wherein the color material is ink.

13. An image processing method as claimed in claim 1, wherein the color material is toner.

14. An image processing apparatus for determining a conversion relationship by using patches, the conversion relationship relating to a generation of color material data for an image output apparatus that outputs an image by using a plurality of kinds of color material including a plurality of color materials of a same color but differing in concentration, said apparatus comprising:

holding means for holding a maximum total color material use amount which is determined by taking into account an adhesion characteristic of each of the plurality of kinds of color material to a printing medium used when the image output apparatus outputs the patches;

combination determining means for, for each of the patches, determining a combination of data for the plurality of kinds of color material constituting a patch within a range of the maximum total color material use amount; and color separation means for determining a predetermined conversion relationship relating to the generation of color material data of the plurality of kinds of color material including a plurality of color materials of a same color but differing in concentration, on the basis of colorimetric values of the patches which are outputted based on the determined combinations of data for the plurality of kinds of color material for the patches.

15. An image processing apparatus as claimed in claim 14, further comprising defined use amount determining means for determining a defined total color material use amount within the range of maximum total color material use amount, and wherein said combination determining means determines the combination of data for the plurality of kinds of color material within a range of the defined total color material use amount.

16. An image processing apparatus as claimed in claim 15, further comprising means for obtaining information on determining the defined total color material use amount, the information being previously set, and wherein said defined use amount determining means determines the defined total color material use amount in accordance with the information.

17. An image processing apparatus as claimed in claim 14, wherein said combination determining means determines the combination of data for the plurality of kinds of color material including only a color material having a higher concentration among the plurality of color materials of the same color but differing in concentration, and said color separation means separates the data for the color material having higher concentration to make data for the plurality of color materials of the same color but differing in concentration so that the predetermined conversion relationship relating to the generation of the color material data for the plurality of kinds of color material is determined.

18. An image processing apparatus as claimed in claim 17, wherein colors of the plurality of kinds of color material are yellow, magenta, cyan and black, and the color materials of magenta and cyan are separated so that the predetermined conversion relationship for generating data for six kinds of color material is determined.

19. An image processing apparatus as claimed in claim 17, wherein said color separating means
  determines a ratio of each the color materials having the same color but differing in concentration on the basis of the combinations of color material data for the plurality of kinds of color material, for each of the patches;
  determines a total use amount of each the color materials having the same color but differing in concentration, on the basis of the determined ratio of each the color materials having the same color, the total use amount of the plurality of kinds of color material including all of the color materials having the same color but differing in concentration and a use amount of color materials excluding the color materials having the same color but differing in concentration from the plurality of kinds of color material; and
  separates the color material data for the color materials having higher a concentration to generate color material data for each of the color materials having the same color but differing in concentration, on the basis of the total use amount of each the color materials having the same color, a colorimetric value of the patches outputted for the combinations of the color materials having the same color but differing in concentration.

20. An image processing apparatus as claimed in claim 14, wherein said combination determining means determines data for the plurality of kinds of color material including all of the plurality of color materials of the same color but differing in concentration.

21. An image processing apparatus as claimed in claim 20, wherein colors of the plurality of kinds of color material are yellow, magenta, cyan, black, and light magenta having a lower concentration than the magenta and light cyan having a lower concentration than the cyan.

22. An image processing apparatus as claimed in claim 14, wherein the predetermined conversion relationship is determined in accordance with a condition that a target color is a color having a highest saturation for each of six hues of yellow, magenta, cyan, red, green and blue.

23. An image processing apparatus as claimed in claim 22, wherein the target colors in six hues of yellow, magenta, cyan, red, green and blue are colors changing in an $L^*C^*$ plane from white to black through yellow, from white to black through magenta, from white to black through cyan, from white to black through red, from white to black through green, and from white to black through blue, respectively.

24. An image processing apparatus as claimed in claim 23, wherein the target color is determined as a line in the $L^*C^*$ plane which is formed by joining a target line that does not include black onto a target line that include black maximally by means of a continuous function from a predetermined point on a $L^*$.

25. An image processing apparatus as claimed in claim 14, wherein the color material is ink.

26. An image processing apparatus as claimed in claim 14, wherein the color material is toner.

27. A program readable by a computer to make the computer execute image processing for determining a conversion relationship by using patches, the conversion relationship relating to a generation of color material data for an image output apparatus that outputs an image by using a plurality of kinds of color material including a plurality of color materials of the same color but differing in concentration, said image processing comprising the steps of:
  providing a maximum total color material use amount which is determined by taking into account an adhesion characteristic of each of the plurality of kinds of color material to a printing medium used when the image output apparatus outputs the patches;
  determining, for each of the patches, a combination of data for the plurality of kinds of color material constituting a patch within a range of the maximum total color material use amount; and
  determining a predetermined conversion relationship relating to the generation of color material data of the plurality of kinds of color material including a plurality of color materials of the same color but differing in concentration, on the basis of colorimetric values of the patches which are outputted based on the determined combinations of data for the plurality of kinds of color material for the patches.

28. A program as claimed in claim 27, wherein said image processing further comprises the step of determining a defined total color material use amount within the range of maximum total color material use amount, and said step of determining the combination of data determines the combination of data for the plurality of kinds of color material within a range of the defined total color material use amount.

29. A storage medium storing a program readably by a computer, the program making the computer execute an image processing for determining a conversion relationship by using the patches, the conversion relationship relating to a generation of color material data for an image output apparatus that outputs an image by using a plurality of kinds of color material including a plurality of color materials of a same color but differing in concentration, said image processing comprising the steps of:
  providing a maximum total color material use amount which is determined by taking into account an adhesion characteristic of each of the plurality of kinds of color material to a printing medium used when the image output apparatus outputs the patches;
  determining, for each of the patches, a combination of data for the plurality of kinds of color material constituting a patch within a range of the maximum total color material use amount; and determining a predetermined conversion relationship relating to the generation of color material data of the plurality of kinds of color material including a plurality of color materials of a same color but differing in concentration, on the basis of colorimetric values of the patches which are outputted based on the determined combinations of data for the plurality of kinds of color material for the patches.

30. A storage medium as claimed in claim 29, wherein said image processing further comprises the step of determining a defined total color material use amount within the range of maximum total color material use amount, and said step of determining the combination of data determines the combination of data for the plurality of kinds of color material within the range of the defined total color material use amount.

31. An image processing method for determining a conversion relationship using patches, a conversion relationship relating to a generation of color material data for an image output apparatus that outputs an image using at least five color materials, said method comprising the steps of:

providing a maximum total color material use amount which is based on an adhesion characteristic of the color materials to a printing medium used by the image output apparatus;

determining a combination of data to output the patches using the color materials within a range of the maximum total color material use amount; and determining a predetermined conversion relationship relating to the generation of color material data of the color materials on the basis of measured values of the patches which are outputted based on the predetermined combinations.

32. An image processing method as claimed in claim 31, wherein the color materials include light magenta and light cyan.

33. An image processing method as claimed in claim 31, wherein the maximum total color material use amount is determined by a type of printing medium.

34. A program readable by a computer to make the computer execute image processing for determining a conversion relationship using patches, a conversion relationship relating to a generation of color material data for an image output apparatus that outputs an image using at least five color materials, said image processing comprising the steps of:

providing a maximum total color material use amount which is based on an adhesion characteristic of the color materials to a printing medium used by the image output apparatus;

determining a combination of data to output the patches using the color materials within a range of the maximum total color material use amount; and determining a predetermined conversion relationship relating to the generation of color material data of the color materials on the basis of measured values of the patches which are outputted based on the predetermined combinations.

35. A program as claimed in claim 34, wherein the color materials include light magenta and light cyan.

36. A program as claimed in claim 34, wherein the maximum total color material use amount is determined by a type of printing medium.

* * * * *

UNITED STATES PATENT AND TRADEMARK OFFICE
CERTIFICATE OF CORRECTION

PATENT NO. : 7,032,989 B2
APPLICATION NO. : 10/629696
DATED : April 25, 2006
INVENTOR(S) : Hiromitsu Nishikawa It is certified that error appears in the above-identified patent and that said Letters Patent is hereby corrected as shown below:

COLUMN 1
Line 29, "on" should be deleted.

COLUMN 2
Line 12, "above described" should read --above-described--.

COLUMN 10
Line 22, "lager" should read --larger--.

COLUMN 11
Line 23, "a" should read --an--;
Line 33, "while" should read --white--;
Line 40, "e.g." should read --e.g.,--;
Line 44, "K" should read --K,--;
Line 45, "K" should read --K,--; and
Line 63, "granulairty," should read --granular,--.

COLUMN 12
Line 8, "realizes" should read --realize--.

COLUMN 13
Line 18, "above described" should read --above-described--;
Line 50, "an" should read --and--;
Line 59, "amount-the" should read --amount - the--; and
Line 62, "amount-the" should read --amount - the--.

COLUMN 14
Line 31, "can" should read --cyan--.

COLUMN 15
Line 6, "above described" should read --above-described--;
Line 24, "above" should read --above- --;
Line 22, "6" should read --6- --;
Line 51, "an" should read --and--; and
Line 63, "above described" should read --above-described--.

COLUMN 16
Line 25, "Instead" should read --Instead of--; and
Line 56, "Information" should read --¶ Information--.

UNITED STATES PATENT AND TRADEMARK OFFICE
CERTIFICATE OF CORRECTION

PATENT NO. : 7,032,989 B2
APPLICATION NO. : 10/629696
DATED : April 25, 2006
INVENTOR(S) : Hiromitsu Nishikawa It is certified that error appears in the above-identified patent and that said Letters Patent is hereby corrected as shown below:

COLUMN 17
Line 38, "lager" should read --larger--.

COLUMN 18
Line 58, "above described" should read --above-described--;

COLUMN 19
Line 34, "of" should read --or--.

COLUMN 20
Line 10, "above described" should read --above-described--;
Line 13, "above described" should read --above-described--;
Line 16, "above described" should read --above-described--;
Line 22, "above described" should read --above-described--;
Line 30, "above described" should read --above-described--;
Line 45, "above described" should read --above-described--; and
Line 67, "plurality" should read --plurality of--.

COLUMN 21
Line 48, "plurality" should read --plurality of--;
Line 56, "each" should read --each of--;
Line 60, "each" should read --each of--; and
Line 62, "each" should read --each of--.

COLUMN 22
Line 7, "each" should read --each of--; and
Line 32, "a L*." should read --an L*.--.

COLUMN 23
Line 31, "each" should read --each of--;
Line 35, "each" should read --each of--;
Line 37, "each" should read --each of--;
Line 46, "higher a" should read --a higher--; and
Line 49, "each" should read --each of--.

UNITED STATES PATENT AND TRADEMARK OFFICE
CERTIFICATE OF CORRECTION

PATENT NO. : 7,032,989 B2
APPLICATION NO. : 10/629696
DATED : April 25, 2006
INVENTOR(S) : Hiromitsu Nishikawa It is certified that error appears in the above-identified patent and that said Letters Patent is hereby corrected as shown below:

COLUMN 24
Line 13, "a L." should read --an L*.--; and
Line 51, "readably" should read --readable--.

Signed and Sealed this

Nineteenth Day of December, 2006

JON W. DUDAS
*Director of the United States Patent and Trademark Office*